United States Patent
White et al.

(10) Patent No.: US 11,898,871 B2
(45) Date of Patent: Feb. 13, 2024

(54) APPARATUS AND METHODS FOR PROVIDING A MAP LAYER OF ONE OR MORE TEMPORARY DYNAMIC OBSTRUCTIONS

(71) Applicant: HERE GLOBAL B.V., Eindhoven (NL)

(72) Inventors: Donta White, Racine, WI (US); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 44 days.

(21) Appl. No.: 17/475,977

(22) Filed: Sep. 15, 2021

(65) Prior Publication Data

US 2023/0084924 A1 Mar. 16, 2023

(51) Int. Cl.
G01C 21/00 (2006.01)
G01C 21/34 (2006.01)
G01C 21/32 (2006.01)
B60W 40/09 (2012.01)

(52) U.S. Cl.
CPC ......... *G01C 21/3889* (2020.08); *B60W 40/09* (2013.01); *G01C 21/32* (2013.01); *G01C 21/3415* (2013.01); *G01C 21/3815* (2020.08); *G01C 21/3859* (2020.08); *B60W 2510/10* (2013.01); *B60W 2510/18* (2013.01); *B60W 2556/50* (2020.02)

(58) Field of Classification Search
None
See application file for complete search history.

(56) References Cited

U.S. PATENT DOCUMENTS

| | | | |
|---|---|---|---|
| 9,836,056 B2 | 12/2017 | Ansari | |
| 10,488,861 B2 | 11/2019 | Allan et al. | |
| 10,901,423 B2 | 1/2021 | Will, IV et al. | |
| 2014/0063232 A1* | 3/2014 | Fairfield | G01S 13/865 382/104 |
| 2015/0254986 A1* | 9/2015 | Fairfield | G08G 1/161 707/687 |
| 2016/0357188 A1* | 12/2016 | Ansari | G05D 1/0274 |

(Continued)

FOREIGN PATENT DOCUMENTS

| | | | |
|---|---|---|---|
| JP | 2010086234 A | * | 4/2010 |
| JP | 2014120112 A | * | 6/2014 |
| WO | WO-2022201962 A1 | * | 9/2022 |

OTHER PUBLICATIONS

Machine translation of JP-2010086234-A (Year: 2010).*

(Continued)

*Primary Examiner* — Anne Marie Antonucci
*Assistant Examiner* — Kyle S Park
(74) *Attorney, Agent, or Firm* — Peter H. Yu; HERE GLOBAL B.V.

(57) ABSTRACT

An apparatus, method and computer program product provide a map layer of one or more temporary dynamic obstructions. For example, the apparatus is configured to receive vehicle/driver behavior data associated with a vehicle at a portion of a road, determine a likelihood of a temporary dynamic obstruction existing proximate to the portion based on the vehicle behavior data, and update a datapoint of a map layer based on the likelihood. The datapoint indicates a state of existence of the temporary dynamic obstruction at the portion.

13 Claims, 14 Drawing Sheets

(56) References Cited

U.S. PATENT DOCUMENTS

| | | | |
|---|---|---|---|
| 2018/0188045 A1* | 7/2018 | Wheeler | G06V 20/64 |
| 2019/0113925 A1* | 4/2019 | Sim | G01C 21/3889 |
| 2019/0156677 A1* | 5/2019 | Nishimura | G01C 3/08 |
| 2019/0212749 A1 | 7/2019 | Chen et al. | |
| 2020/0065711 A1 | 2/2020 | Clement et al. | |
| 2020/0109954 A1 | 4/2020 | Li et al. | |
| 2020/0241530 A1 | 7/2020 | Caveney | |
| 2021/0269045 A1* | 9/2021 | Katz | G06V 20/56 |
| 2021/0390329 A1* | 12/2021 | Ren | G06V 10/82 |
| 2021/0396528 A1* | 12/2021 | St. Romain | G01C 21/3691 |
| 2022/0041184 A1* | 2/2022 | Raichelgauz | G08G 1/0133 |
| 2022/0236077 A1* | 7/2022 | Clarysse | G01C 21/3841 |

OTHER PUBLICATIONS

Machine translation of WO-2022201962-A1 (Year: 2022).*
Machine translation of JP-2014120112-A (Year: 2014).*
Mohammad Shokrolah Shirazi, et al., "Looking at Intersections: A Survey of Intersection Monitoring, Behavior and Safety Analysis of Recent Studies," IEEE Transactions on Intelligent Transportation Systems, Aug. 2016 (pp. 1-22).

* cited by examiner

APPARATUS AND METHODS FOR PROVIDING A MAP LAYER OF ONE OR MORE TEMPORARY DYNAMIC OBSTRUCTIONS

TECHNICAL FIELD

The present disclosure generally relates to the field of identifying temporary dynamic obstructions, associated methods and apparatus, and in particular concerns, for example, an apparatus configured to provide a map layer of one or more temporary dynamic obstructions based on vehicle/driver behavior data and contextual data.

BACKGROUND

Obstructions within a road network may hinder visibility of vehicle operators, thereby increasing likelihood of accidents and heavy traffic within the road network. Image sensing devices may be provided within the road network for detecting obstructions and notifying local establishment to deploy field personnel for removing such obstructions. However, performing image analysis for detecting obstructions within images and constant use of image sensing devices are resource intensive. Further, image analysis is also subject to error, and as such, image sensing devices may incorrectly notify existence of obstructions within the road network.

The listing or discussion of a prior-published document or any background in this specification should not necessarily be taken as an acknowledgement that the document or background is part of the state of the art or is common general knowledge.

BRIEF SUMMARY

According to a first aspect, an apparatus including at least one processor and at least one non-transitory memory including computer program code instructions is described. The computer program code instructions are configured to, when executed, cause the apparatus to receive vehicle behavior data associated with a vehicle at a portion of a road, determine a likelihood of a temporary dynamic obstruction existing proximate to the portion based on the vehicle behavior data, and update a datapoint of a map layer based on the likelihood. The datapoint indicates a state of existence of the temporary dynamic obstruction at the portion.

According to a second aspect, a non-transitory computer-readable storage medium having computer program code instructions stored therein is described. The computer program code instructions, when executed by at least one processor, cause the at least one processor to receive driver behavior data associated with one or more vehicles at or proximate to an intersection. The computer program code instructions, when executed by at least one processor, further cause the at least one processor to, responsive to the driver behavior data indicating existence of a temporary dynamic obstruction at or proximate to the intersection, validate the existence by receiving and analyzing contextual data associated with the intersection. The contextual data are image data associated with the intersection, weather data associated with the intersection, or a combination thereof. The computer program code instructions, when executed by at least one processor, further cause the at least one processor to, responsive to the contextual data validating the existence, update a datapoint of a map layer to indicate that the temporary dynamic obstruction exists at or proximate to the intersection.

According to a third aspect, a method of updating a map layer of one or more temporary dynamic obstructions is described. The method includes receiving driver behavior data associated with one or more vehicles at or proximate to an intersection and updating a confidence value indicating a likelihood of a temporary dynamic obstruction existing at or proximate to the intersection based on the driver behavior data and a frequency at which the driver behavior data are received. The method further includes, responsive to the confidence value being equal to or greater than a threshold value, creating a datapoint within the map layer, wherein the datapoint indicates existence of the temporary dynamic obstruction at or proximate to the intersection. The method further includes, subsequent to creating the datapoint, responsive to the confidence value being lower than a threshold value, removing the datapoint from the map layer.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

Temporary obstructions typically form within a road network and hinder visibility of vehicle operators. For example, an obstruction, such as a snow mound, may form in corners of an intersection due to a way of which winter service vehicles move snow towards peripheral areas of a road. Over time, the size of the snow mound may become large enough to hinder visibility of vehicle operators attempting to merge into an intersecting road and prevent the operators from observing the traffic of the intersecting road. To gain improved visibility, the vehicle operators may maneuver vehicles closer to the intersection. However, such maneuver may interfere with the intersecting road, thereby increasing likelihood of accidents. Additionally, the process of which the vehicle operators maneuver the vehicles to gain improved visibility increases the amount of time that the vehicles stay within the intersection, thereby increasing overall traffic within the intersection and road segments connected thereto. Image sensing devices may be provided within the road network for detecting obstructions and notifying local establishment to deploy field personnel for removing such obstructions. However, performing image analysis for detecting temporary obstructions within images and constant use of image sensing devices are resource intensive. Further, such image analysis is also subject to error and objects within or proximate to a road can be incorrectly as temporary obstructions. As such, the local establishment may be falsely notified regarding the existence of temporary obstructions within the road network.

There will now be described an apparatus and associated methods that may address these issues.

Figure 1A:
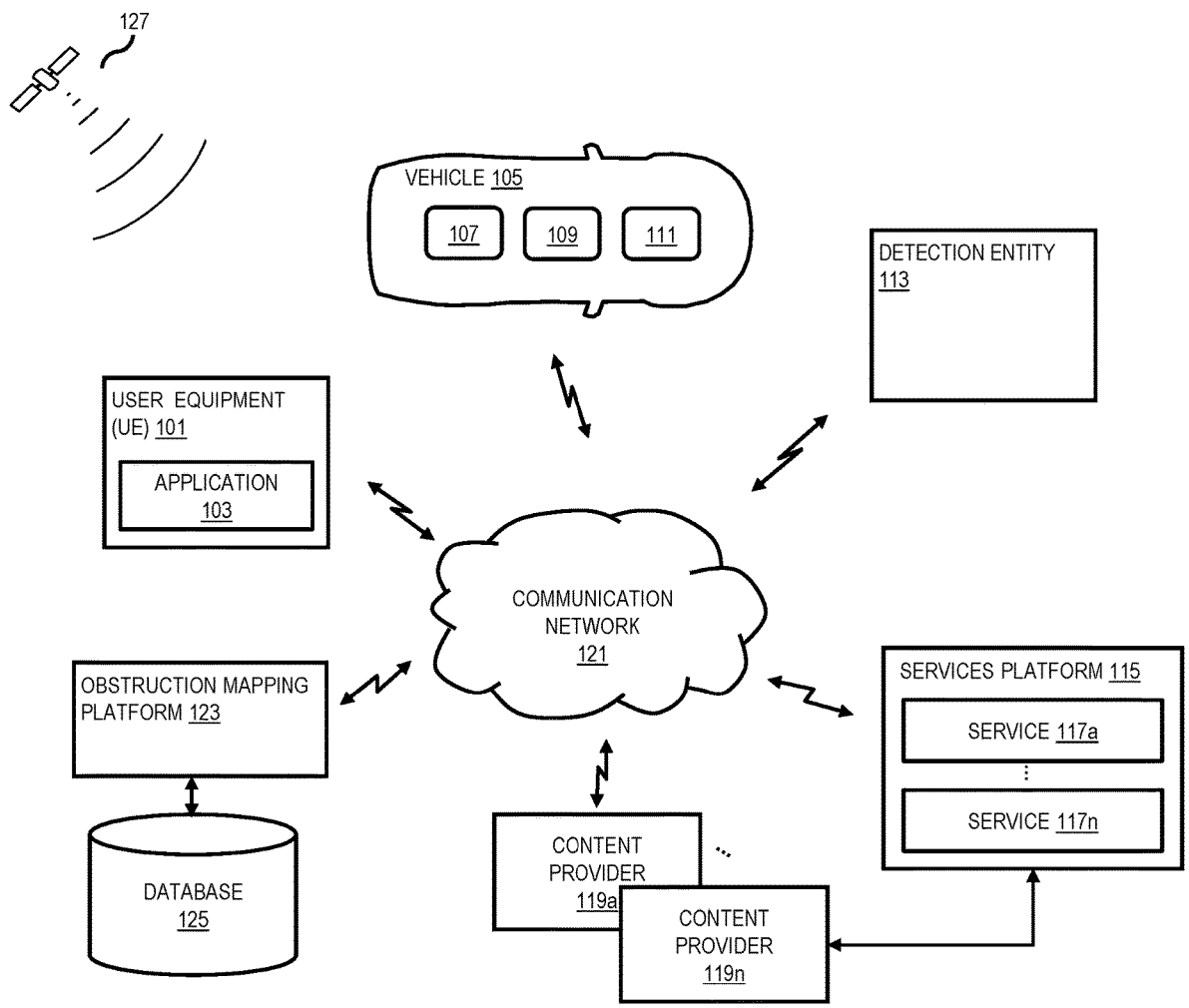
FIG. 1A illustrates a diagram of a system capable of providing a map layer of one or more temporary dynamic obstructions.

FIG. 1A is a diagram of a system 100 capable of providing a map layer of one or more temporary dynamic obstructions, according to one embodiment. Herein, a temporary dynamic obstruction is a physical obstruction that is estimated to exist for a predetermined amount of time. In one embodiment, a temporary dynamic obstruction may be an object that changes in form over the predetermined amount of time (e.g., size, shape, etc.). In one embodiment, a temporary dynamic obstruction may be an object that visually obstructs. In one embodiment, a temporary dynamic obstruction may be an object that hinders a sensor (e.g., an image sensor) from sensing a target object. In the illustrated embodiment, the system includes a user equipment (UE) 101, a vehicle 105, a detection entity 113, a services platform 115, content providers 119a-119n, a communication network 121, an obstruction mapping platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the obstruction mapping platform 123 via the communication network 121. The obstruction mapping platform 123 performs one or more functions associated with providing a map layer of one or more temporary dynamic obstructions. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles (including the vehicle 105), or any combination thereof, including the accessories and peripherals of these devices. In one embodiment, the UE 101 may be a head-up display (HUD) system that is associate with or integrated with the one or more vehicles. In one embodiment, the UE 101 can be an in-vehicle navigation system, a personal navigation device (PND), a portable navigation device, a cellular telephone, a mobile phone, a personal digital assistant (PDA), a watch, a camera, a computer, etc. In one embodiment, the one or more vehicles may have cellular or Wi-Fi connection either through the inbuilt communication equipment or from the UE 101 associated with the vehicles. It should be appreciated that the UE 101 can support any type of interface to the user (such as "wearable" devices, etc.).

In the illustrated embodiment, the application 103 may be any type of application that is executable by the UE 101, such as a navigation application, a mapping application, a location-based service application, a content provisioning service, a camera/imaging application, a media player application, a social networking application, a calendar application, or any combination thereof. In one embodiment, one of the applications 103 at the UE 101 may act as a client for the obstruction mapping platform 123 and perform one or more functions associated with the functions of the obstruction mapping platform 123 by interacting with the obstruction mapping platform 123 over the communication network 121. In one embodiment, a user may access the application 103 through the UE 101 for performing functions associated with the obstruction mapping platform 123 and/or receiving information regarding the functions. In one embodiment, the application 103 may assist in conveying information regarding at least one attribute associated with a road network via the communication network 121. Such information may indicate one or more temporary dynamic obstructions within the road network.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a manually controlled vehicle, semi-autonomous vehicle (e.g., some routine motive functions, such as parking, are controlled by the vehicle 105), or an autonomous vehicle (e.g., motive functions are controlled by the vehicle 105 without direct driver input). In this illustrated example, the vehicle 105 includes a plurality of sensors 107, an on-board computing platform 109, and an on-board communications platform 111.

The autonomous level of a vehicle can be a Level 0 autonomous level that corresponds to no automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle. In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device (not illustrated) may be included in the vehicle 105. The assisted driving device may include memory, a processor, and systems to communicate with the UE 101.

The term autonomous vehicle may refer to a self-driving or driverless mode in which no passengers are required to be on board to operate the vehicle. An autonomous vehicle may be referred as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate and respond to lane marking indicators (lane marking type, lane marking intensity, lane marking color, lane marking offset, lane marking width, or other characteristics) and driving commands or navigation commands.

In one embodiment, the vehicle 105 may be an HAD vehicle or an ADAS vehicle. An HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In the illustrated embodiment, the sensors 107 may include image sensors (e.g., electronic imaging devices of both analog and digital types, which include digital cameras, camera modules, camera phones, thermal imaging devices, radar, sonar, lidar, etc.), a global positioning sensor for gathering location data, a signal detection sensor for detecting wireless signals or receivers for different short-range communications (e.g., Bluetooth, Wi-Fi, Li-Fi, near field communication (NFC), etc.), temporal information sensors, audio recorders for converting sound to sound data, velocity sensors, light sensors, oriental sensors augmented with height sensor and acceleration sensor, tilt sensors to detect the degree of incline or decline of the vehicle 105 along a path of travel, etc. In a further embodiment, sensors about the perimeter of the vehicle 105 may detect the relative distance of the vehicle 105 from other vehicles, establishments, stationary sensory devices within an area, road objects (e.g., road markings), lanes, or roadways, pedestrians, traffic lights, road features (e.g., curves) and any other objects, or a combination thereof. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies. One or more of the sensors 107 may be a sensor capable of detecting actuation of one or more controls, interfaces, or devices that provides one or more designated vehicle functions by a human operator. By way of example, said sensor may be a sensor that can detect actuation of a vehicle brake pedal, an accelerator pedal, windshield wipers, etc. In one embodiment, the one or more of the sensors 107 may be a sensor capable of detecting a degree of which said controls, interfaces, or devices are actuated by a human operator. By way of example, said sensor may be a sensor that can detect a degree of which the vehicle brake pedal is actuated, a degree of which the accelerator pedal is actuated, a degree of which a steering wheel is turned, etc.

The on-board computing platform 109 performs one or more functions associated with the vehicle 105. In one embodiment, the on-board computing platform 109 may aggregate sensor data generated by at least one of the sensors 107 and transmit the sensor data via the on-board communications platform 111. The on-board computing platform 109 may receive control signals and/or other signals for performing one or more of the functions associated with the obstruction mapping platform 123, the UE 101, the services platform 115, one or more of the content providers 119a-119n, or a combination thereof via the on-board communications platform 111. The on-board computing platform 109 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 111 includes wired or wireless network interfaces to enable communication with external networks. The on-board communications platform 111 also includes hardware (e.g., processors, memory, storage, antenna, etc.) and software to control the wired or wireless network interfaces. In the illustrated example, the on-board communications platform 111 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); NFC; local area wireless network (including IEEE 802.11 a/b/g/n/ac or others), dedicated short range communication (DSRC), and Wireless Gigabit (IEEE 802.11ad), etc.). In some examples, the on-board communications platform 111 includes a wired or wireless interface (e.g., an auxiliary port, a Universal Serial Bus (USB) port, a Bluetooth® wireless node, etc.) to communicatively couple with the UE 101.

The detection entity 113 may be equipped with one or more image sensors capable of capturing one or more images including one or more objects within an external environment and generating image data corresponding to said captured images. The detection entity 113 may be further equipped with a communication interface (i.e., wired or wireless communication means) for providing the image data to the obstruction mapping platform 123. The detection entity 113 may be, for example, one or more other UEs (e.g., having similar capabilities as the UE 101), one or more other vehicles (e.g., having similar capabilities as the vehicle 105), one or more stationary roadside devices equipped with sensors (e.g., traffic cameras), or a combination thereof. In one embodiment, the detection entity 113 may acquire or store information indicating a location at which the detection entity 113 has captured an image, a direction at which the detection entity 113 has captured the image, a time at which the detection entity has captured the image, or a combination thereof. The detection entity 113 may transmit the contextual information with the image data to the obstruction mapping platform 123 over the communication network 121.

The services platform 115 may be an original equipment manufacturer (OEM) platform that provides one or more services 117a-117n (collectively referred to as services 117). In one embodiment, the one or more services 117 may be sensor data collection services. By way of example, vehicle sensor data provided by the sensors 107 may be transferred to the UE 101, the obstruction mapping platform 123, the database 125, or other entities communicatively coupled to the communication network 121 through the services platform 115. By way of example, the services platform 115 may also be other third-party services and include mapping services, navigation services, travel planning services, notification services, social networking services, content (e.g., audio, video, images, etc.) provisioning services, application services, storage services, contextual information determination services, weather-based services, location-based services, information-based services, etc. In one embodiment, the services platform 115 uses the output data generated by of the obstruction mapping platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the obstruction mapping platform 123, the database 125, or the combination thereof. The content provided may be any type of content, such as map content, textual content, audio content, video content, image content, etc. In one embodiment, the content providers 119 may provide content that may aid in detecting or validating existence of temporary dynamic obstructions, or other related characteristics. In one embodiment, the content providers 119 may also store content associated with the UE 101, the vehicle 105, detection entity 113, services platform 115, the obstruction mapping platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the obstruction mapping platform 123 may be a platform with multiple interconnected components. The obstruction mapping platform 123 may include multiple servers, intelligent networking devices, computing devices, components and corresponding software for providing a map layer of one or more temporary obstructions. It should be appreciated that that the obstruction mapping platform 123 may be a separate entity of the system 100, included within the UE 101 (e.g., as part of the applications 103), included within the vehicle 105 (e.g., as part of an application stored in memory of the on-board computing platform 109), included within the services platform 115 (e.g., as part of an application stored in server memory for the services platform 115), included within the content providers 119 (e.g., as part of an application stored in server memory for the content providers 119), or a combination thereof.

The obstruction mapping platform 123 is capable of: (1) acquiring data from the vehicle 105, one or more detection entities 113, or a combination thereof; (2) using the data to determine a state of one or more temporary dynamic obstructions; and (3) update a map layer to indicate the state of the one or more temporary dynamic obstructions. The data may be driver behavior data, vehicle behavior data, image data, weather data, other relevant data, or a combination thereof.

The obstruction mapping platform 123 may acquire driver behavior data from the vehicle 105. In one embodiment, the driver behavior data may be defined by an action or a series of actions performed by a vehicle operator with respect to vehicle controls, interfacing devices within the vehicle 105, or other devices for actuating one or more vehicle functions. By way of example, the driver behavior data may indicate a way of which the vehicle operator actuates a brake pedal or an accelerator. The driver behavior data may also indicate a degree of which the vehicle operator actuates the brake pedal or the accelerator or a degree of which the vehicle operator steers a steering wheel, etc. In one embodiment, the driver behavior data may also indicate driver behaviors that do not directly affect vehicle controls. By way of example, such driver behavior data may be defined by a location of the vehicle operator's head, a trajectory or a movement of the vehicle operator's head, an orientation of the vehicle operator's head, a plurality of orientations of the vehicle operator's head for a predetermined amount of time, the vehicle operator's facial expression, the vehicle operator's facial expressions for a predetermined amount of time, the vehicle operator's eye direction, the vehicle operator's eye directions for a predetermined amount of time, one or more words spoken by the vehicle operator, or a combination thereof. For example, if a vehicle operator is in a vehicle cabin and moves his/her head forward, sensors within the vehicle cabin may capture such behavior and generate corresponding driver behavior data.

In one embodiment, the obstruction mapping platform 123 may acquire vehicle behavior data from the vehicle 105. The vehicle behavior data may indicate a way of which the vehicle 105 moves. The vehicle behavior data may indicate a way of which the vehicle 105 moves within a predetermined period or a way of which the vehicle 105 moves while being within a predetermined distance with respect to a portion of a road. By way of example, the vehicle behavior data may indicate that the vehicle 105 slowly moves forward when the vehicle 105 is within a predetermined distance from an intersection. In one embodiment, the vehicle behavior data may be defined by GPS data associated with the vehicle 105. In one embodiment, the vehicle behavior data may correspond to driver behavior data in that the driver behavior data can be defined by one or more actions performed by a vehicle operator that directly affect the movement of the vehicle 105.

In one embodiment, the obstruction mapping platform 123 may continuously receive driver/vehicle behavior data from the vehicle 105 as the vehicle 105 traverses a route. In one embodiment, the obstruction mapping platform 123 may receive driver/vehicle behavior data from the vehicle 105 only when the vehicle 105 is traversing or will be traversing one or more portions of the route that: (1) includes or is proximate to one or more temporary dynamic obstructions; or (2) has previously included or was proximate to one or more temporary dynamic obstructions.

The obstruction mapping platform 123 may use the driver/vehicle behavior data to determine whether a temporary dynamic obstruction exists proximate to the vehicle 105. In one embodiment, the obstruction mapping platform 123 may embody a machine learning model that receives the driver/vehicle behavior data as input and outputs an indication of whether a temporary dynamic obstruction exists proximate to the vehicle 105. Such machine learning model may be trained by using historical data including past driver/vehicle behavior data acquired from one or more vehicles at a past time point or period in which the one or more vehicles has encountered a temporary dynamic obstruction. The machine learning model may compare the inputted driver/vehicle behavior data to one or more past driver/vehicle behavior data indicating existence of a temporary dynamic obstruction. If the inputted driver/vehicle behavior data correspond to one of such past driver/vehicle behavior data, the machine learning model outputs an indication that a temporary dynamic obstruction exists proximate to the vehicle 105.

It is contemplated that simply comparing inputted driver/vehicle behavior data to a plurality of past driver/vehicle behavior data indicating existence of a temporary dynamic obstruction may be resource intensive since driver/vehicle behavior data vary depending on various factors, such as road types and location of the temporary dynamic obstruction with respect to a driver/vehicle. For example, if a temporary dynamic obstruction exists within a road segment having multiple lanes, vehicle behavior data acquired from a vehicle traversing the road segment may indicate that the vehicle moves to a different lane to avoid the temporary dynamic obstruction; whereas, if a temporary dynamic obstruction exists within a corner of an intersection, vehicle behavior data acquired from a vehicle traversing the intersection may indicate that the vehicle slowly moves forward to gain a clear field of vision of the intersecting road over the temporary dynamic obstruction. As such, in one embodiment, the obstruction mapping platform 123 may: (1) select a subset from a plurality of past driver/vehicle behavior data indicating existence of a temporary dynamic obstruction based on a location of the vehicle 105 with respect to a specific portion of a road; and (2) compare driver/vehicle behavior data acquired from the vehicle 105 with the subset. For example, if the obstruction mapping platform 123 determines that the vehicle 105 is at or will be encountering an intersection, the obstruction mapping platform 123 selects a subset of past driver/vehicle behavior data indicating existence of a temporary dynamic obstruction at the intersection and compares driver/vehicle behavior data received from the vehicle 105 with the subset. In one embodiment, the obstruction mapping platform 123 identifies an attribute associated with a specific portion of a road and uses the attribute to select a subset for comparison. For example, continuing from the previous example, if the obstruction mapping platform 123 determines that a subset of past driver/vehicle behavior data indicating existence of a temporary dynamic obstruction at the intersection does not exist, the obstruction mapping platform 123: (1) identifies attributes of the intersection (e.g., type of intersection, width, number intersections, number of lanes of each intersecting road, location of the intersection, etc.); (2) identifies another intersection having similar attributes as the intersection; (3) selects a subset of past driver/vehicle behavior data indicating existence of a temporary dynamic obstruction at the other intersection; and (4) compares driver/vehicle behavior data received from the vehicle 105 with the subset of the other intersection.

In one embodiment, the obstruction mapping platform 123 may estimate a location of the temporary dynamic obstruction based on the driver/vehicle behavior data. For example, vehicle behavior data acquired from a plurality of vehicles that have traversed a road segment may indicate that the vehicles moved to a different lane of the road segment at a specific location in the road segment. Accordingly, the obstruction mapping platform 123 may estimate that a temporary dynamic obstruction exists proximate to the specific location. By way of another example, driver behavior data acquired from a plurality of vehicles that have merged into an intersecting road of an intersection may indicate that the drivers have moved the heads thereof forward as the vehicles encountered the intersection. Accordingly, the obstruction mapping platform 123 may estimate that a temporary dynamic obstruction exists at a corner of the intersection. In one embodiment, the obstruction mapping platform 123 may use a machine learning model to estimate a location of a temporary dynamic obstruction. Such machine learning model may be trained by using a plurality of past driver/vehicle behavior data that indicated existence of temporary dynamic obstructions.

In one embodiment, if driver/vehicle behavior data acquired from the vehicle 105 indicate existence of a temporary dynamic obstruction, the obstruction mapping platform 123 may validate the existence of the temporary dynamic obstruction by processing a plurality of images captured by the vehicle 105 for a predetermined period, where the predetermined period includes a time point or a period in which the obstruction mapping platform 123 has acquired the driver/vehicle behavior data. In one embodiment, if driver/vehicle behavior data acquired from the vehicle 105 indicate existence of a temporary dynamic obstruction, the obstruction mapping platform 123 may validate the existence of the temporary dynamic obstruction by communicating with at least one detection entity 113 that is within or proximate to a location in which the vehicle 105 has acquired the driver/vehicle behavior data. The obstruction mapping platform 123 may acquire attribute data associated with the detection entity 113 to determine: (1) an angle at which an image sensor of the detection entity 113 is oriented; and (2) a range at which the image sensor is capable of detecting an object. Such attribute data may be acquired from the detection entity 113, the services platform 125, the content providers 119, the database 125, or a combination thereof. Using the attribute data, the obstruction mapping platform 123 may determine an area of which the image sensor is capable of detecting an object (will be referred as "detection area," herein). As mentioned previously, the obstruction mapping platform 123 may estimate a location of the temporary dynamic obstruction using the driver/vehicle behavior data. As such, if the estimated location of the temporary dynamic obstruction is within the detection area of the detection entity 113, the obstruction mapping platform 123 may: (1) acquire one or more images from the detection entity 113; and (2) process the one or more images to validate the existence of the temporary dynamic obstruction. If the detection entity 113 is a non-stationary entity (e.g., another vehicle), the obstruction mapping platform 123 may determine a route in which the non-stationary entity has traversed within a predetermined period, where the predetermined period includes a time point or a period in which the obstruction mapping platform 123 has acquired the driver/vehicle behavior data indicating existence of the temporary dynamic obstruction. For each position/orientation of the non-stationary entity within the route, the obstruction mapping platform 123 may determine a detection area and determine whether the estimated location of the temporary dynamic obstruction is within the detection area. If the estimated location of the temporary dynamic obstruction is within a detection area of a given position/orientation, the obstruction mapping platform 123 may: (1) acquire one or more images that was captured by the non-stationary entity at a time point or period of which the non-stationary entity was at the position/orientation; and (2) process the one or more images to validate the existence of the temporary dynamic obstruction. The obstruction mapping platform 123 may embody another machine learning model for identifying a temporary dynamic obstruction from an image. By way of example, the machine learning model may be defined, at least in part by, computer-vision algorithms, such as convolutional neural networks (CNN). In one embodiment, the machine learning model may be trained to identify a temporary dynamic obstruction by using a first set of images of settings without temporary dynamic obstructions and a second set of images of the setting including temporary dynamic obstructions. Once the image processing is performed and the existence of the temporary dynamic obstruction is validated via the image processing, the obstruction mapping platform 123 may identify one or more attributes of the temporary dynamic obstruction. Such attribute may indicate a type of temporary dynamic obstruction, a shape/size of temporary dynamic obstruction, or a combination thereof.

In one embodiment, if driver/vehicle behavior data acquired from the vehicle 105 indicate existence of a temporary dynamic obstruction, the obstruction mapping platform 123 may validate the existence of the temporary dynamic obstruction by acquiring weather data from the services platform 115, the content providers 119, or a combination thereof. Specifically, the weather data may indicate a current weather condition and/or one or more past weather conditions that have affected a location in which the vehicle 105 has acquired the driver/vehicle behavior data. If the current weather condition and/or the one or more past weather conditions are types of weather conditions are known to render temporary dynamic obstructions, the obstruction mapping platform 123 determines that the temporary dynamic obstruction exists based on the weather data. In one embodiment, the weather data may indicate precipitation type, precipitation intensity, air temperature, precipitation rate, wind direction, or a combination thereof. In one embodiment, the weather data may indicate that a storm, a snowstorm, or a snowfall has recently affected a given area.

In one embodiment, the obstruction mapping platform 123 may use a machine learning model to estimate a duration of which a temporary dynamic obstruction is predicted to exist. In such embodiment, the machine learning model may estimate the duration based on data indicating: (1) a location of the temporary dynamic obstruction; (2) attribute associated with the temporary dynamic obstruction (e.g., type of temporary dynamic obstruction, a shape/size of temporary dynamic obstruction, etc.); (3) a current weather condition and/or one or more future weather conditions for the location of the temporary dynamic obstruction; or (4) a combination thereof. The machine learning model may be trained by using historical data indicating: (1) locations of past temporary dynamic obstructions; (2) attributes of past temporary dynamic obstructions; (3) past weather conditions that affected the locations; (4) past events that occurred proximate to the locations; or (5) a combination thereof. In one embodiment, the machine learning model may receive a starting time/day of the duration and calculate the duration by selecting one or more of the historical data that are associated with similar time/day as the starting time/day. By way of example, the obstruction mapping platform 123 identifies a snow mound formed near an intersection as a temporary dynamic obstruction and is requested estimate a duration of which the snow mound predicted to exist. In response, the machine learning model determines the starting time/day of the duration as a time/day of which the request was received and identifies one or more of the historical data that are associated with the time/day. Said historical data may indicate that similar snow mounds were formed at the intersection in prior years at the same time/day and further indicate durations of such snow mounds. The machine learning model may use said historical data to estimate the duration of the snow mound (e.g., averaging the durations of past snow mounds).

In one embodiment, the obstruction mapping platform 123 may assign a confidence value indicating a confidence of a temporary dynamic obstruction existing at a given location. The confidence value may be a sum of subsidiary confidence values. The subsidiary confidence values include: (1) a first subsidiary confidence value defined by one or more instances of which the existence of the temporary dynamic obstruction is validated through vehicle/driver behavior data; (2) a second subsidiary confidence value defined by one or more instances of which the existence of the temporary dynamic obstruction is validated through image processing; and (3) a third subsidiary confidence value defined by one or more instances of which the existence of the temporary dynamic obstruction is validated through weather data. In one embodiment, each of the plurality of subsidiary confidence values may be assigned with a weight. It is contemplated that validating existence of a temporary dynamic obstruction using one or more types of data may be more significant than using one or more other types of data. By way of example, validating existence of a temporary dynamic obstruction through image data may be more significant than validating the existence of the temporary dynamic obstruction through weather data. As such, in one embodiment, each of the first and the second subsidiary confidence values may be assigned with a greater weight than the third subsidiary confidence value. In one embodiment, the weight of the second subsidiary confidence value may be the greatest. Each of the subsidiary confidence values may decay over time. Specifically, if the process of validating the existence of a temporary dynamic obstruction does not occur for a predetermined duration, a subsidiary confidence value decreases by a predetermined amount.

One or more additional subsidiary confidence values is contemplated. For example, the obstruction mapping platform 123 may receive data indicating that a number of winter service vehicles have traversed an intersection, thereby indicating likelihood of a temporary dynamic obstruction, such as a snow mound, forming at one or more corners of the intersection. Such data may be used to establish an additional subsidiary confidence value. By way of another example, the obstruction mapping platform 123 may receive data indicating attributes associated with one or more portions of a road. Such attributes may indicate that the one or more road segments and/or intersections is within a zone that is assigned with a type of variance. Certain types of variances are known to induce heavy traffic. For example, commercial establishments may include drive-through variances, and areas for entering/exiting the establishments inherently increase traffic and likelihood of accidents, thereby increasing the likelihood of temporary dynamic obstructions forming in the areas. In such example, the degree of traffic impacting the areas may vary based on one or more periods within a day (e.g., for driver-through variance, heavier traffic occurs during breakfast, lunch, or dinner hours). As such, the obstruction mapping platform 123 may establish an additional subsidiary confidence value based on a variance type of a portion of a road and a time at which the portion of the road is encountered by the vehicle 105.

If a confidence value exceeds a threshold value, the obstruction mapping platform 123 may update a map layer to indicate that a temporary dynamic obstruction exists at a given location, and conversely, if the confidence value is at or below the threshold value, the obstruction mapping platform 123 may update the map layer to remove the temporary dynamic obstruction. The obstruction mapping platform 123 may use the map layer to: (1) provide, to the UE 101, a notification indicating that the vehicle 105 is about to encounter a temporary dynamic obstruction; (2) provide, to an establishment, a notification to indicating existence of a temporary dynamic obstruction; (3) provide a route that avoids locations including temporary dynamics obstructions; or (4) a combination thereof.

In the illustrated embodiment, the database 125 stores information on road links (e.g., road type, road length, road breadth, slope information, lane information, curvature information, etc.), road nodes, and probe data for one or more road links (e.g., traffic density information). In one embodiment, the database 125 may include any multiple types of information that can provide means for aiding in providing a map layer of one or more temporary dynamic obstructions. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, and the obstruction mapping platform 123 communicate with each other via the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises: (1) header information associated with a particular protocol; and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
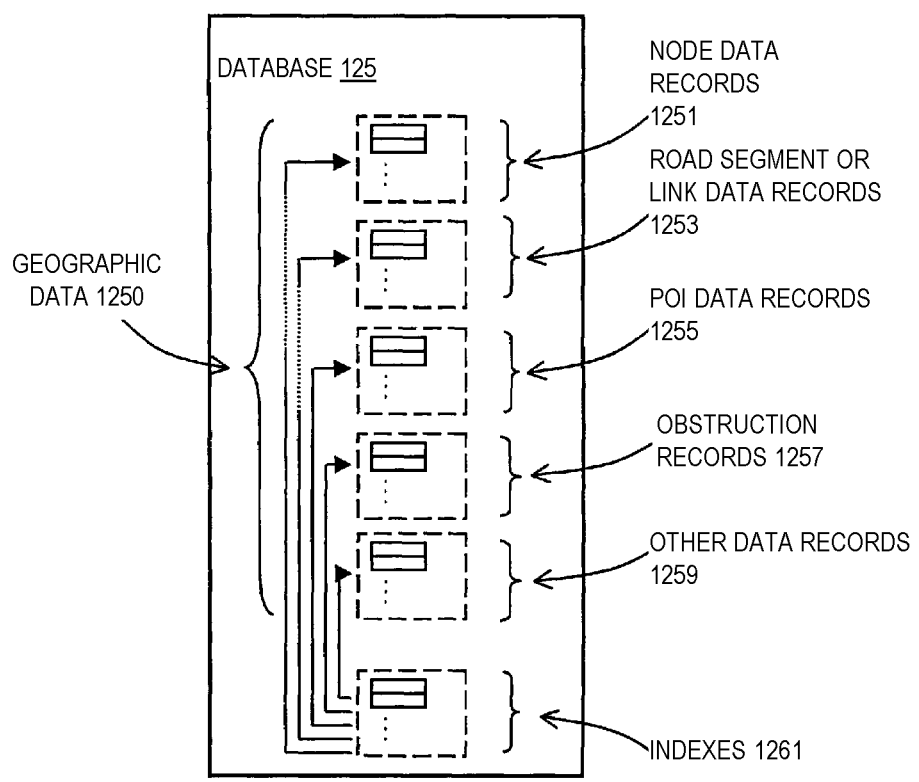
FIG. 1B illustrates a diagram of the database within the system of FIG. 1A.

FIG. 1B is a diagram of a database 125 (e.g., a map or geographic database), according to one embodiment. In one embodiment, the database 125 includes geographic data 1250 used for (or configured to be compiled to be used for)

mapping and/or navigation-related services. In one embodiment, the following terminology applies to the representation of geographic features in the database 125.

a. "Node"—A point that terminates a link.
b. "Road segment"—A straight line connecting two points.
c. "Link" (or "edge")—A contiguous, non-branching string of one or more road segments terminating in a node at each end.

In one embodiment, the database 125 follows certain conventions. For example, links do not cross themselves and do not cross each other except at a node. Also, there are no duplicated shape points, nodes, or links. Two links that connect each other have a common node.

As shown, the database 125 includes node data records 1251, road segment or link data records 1253, POI data records 1255, obstruction records 1257, other records 1259, and indexes 1261, for example. More, fewer or different data records can be provided. In one embodiment, additional data records (not shown) can include cartographic ("carto") data records, routing data, and maneuver data. In one embodiment, the indexes 1261 may improve the speed of data retrieval operations in the database 125. In one embodiment, the indexes 1261 may be used to quickly locate data without having to search every row in the database 125 every time it is accessed.

In exemplary embodiments, the road segment data records 1253 are links or segments representing roads, streets, or paths, as can be used in the calculated route or recorded route information for determination of one or more personalized routes. The node data records 1251 are end points (such as intersections) corresponding to the respective links or segments of the road segment or link data records 1253. The node data records 1251 may indicate node type, node size, a number of intersecting road segments or links, lane information, traffic control information, or a combination thereof. The road segment or link data records 1253 and the node data records 1251 represent a road network, such as used by vehicles, cars, and/or other entities. Alternatively, the database 125 can contain path segment and node data records or other data that represent pedestrian paths or areas in addition to or instead of the vehicle road record data, for example.

Links, segments, and nodes can be associated with attributes, such as geographic coordinates, street names, address ranges, speed limits, turn restrictions at intersections, variance types, and other attributes, as well as POIs, such as gasoline stations, hotels, restaurants, museums, stadiums, offices, automobile dealerships, auto repair shops, stores, other buildings, parks, tunnels, etc. The database 125 can include data about the POIs and their respective locations in the POI data records 1255. The data about the POIs may include data about places, such as cities, towns, or other communities, and other geographic features, such as bodies of water, mountain ranges, etc. Such place or feature data can be part of the POI data records 1255 or can be associated with POIs or POI data records 1255 (such as a data point used for displaying or representing a position of a city).

In one embodiment, the database 125 includes obstruction records 1257. The obstruction records 1257 may include a map layer including one or more temporary dynamic obstructions. The obstruction records 1257 may indicate a location of a temporary dynamic obstruction, a type of temporary dynamic obstruction, a shape/size of temporary dynamic obstruction, an estimated duration of which the temporary dynamic obstruction is predicted to exist, historical data indicating time points at which information regarding the temporary dynamic obstruction was updated, a confidence value, a plurality of subsidiary confidence values, or a combination thereof. The obstruction records 1257 may also maintain past records of temporary dynamic obstructions that were removed from a map layer.

Other records 1259 may include data and/or algorithms for detecting and updating one or more temporary dynamic obstructions. Other records 1259 may include: (1) historical data including driver/vehicle behavior data indicating existence of a temporary dynamic obstruction; (2) historical data including driver/vehicle behavior data indicating locations of temporary dynamic obstructions; (3) historical data including images of settings without temporary dynamic obstructions; (4) historical data including images of settings with temporary dynamic obstructions; (5) historical data including images of types of temporary dynamic obstructions; (6) historical data indicating travel history of winter service vehicles; (7) historical data indicating traffic history for one or more road segments, road links, road nodes; (8) other data for detecting temporary dynamic obstructions; or (9) a combination thereof.

In one embodiment, the database 125 can be maintained by one or more of the content providers 119 in association with a map developer. The map developer can collect geographic data 1250 to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe road signs and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing a map layer of one or more temporary dynamic obstructions may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 2:
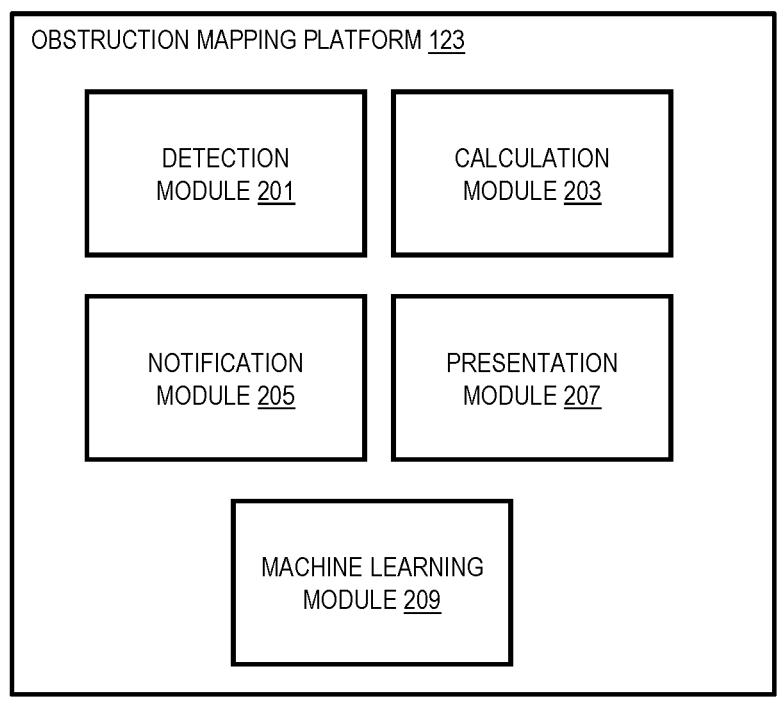
FIG. 2 illustrates a diagram of the components of the obstruction mapping platform of FIG. 1A.

FIG. 2 is a diagram of the components of the obstruction mapping platform 123, according to one embodiment. By way of example, the obstruction mapping platform 123 includes one or more components for providing a map layer of one or more temporary dynamic obstructions. It is contemplated that the functions of these components may be combined in one or more components or performed by other components of equivalent functionality. In this embodiment, the obstruction mapping platform 123 includes a detection module 201, a calculation module 203, a notification module 205, a presentation module 207, and a machine learning module 209.

The detection module 201 may acquire information and/or data for providing a map layer of one or more temporary dynamic obstructions. In one embodiment, the detection module 201 may acquire driver behavior data from the vehicle 105. Specifically, one or more of the sensors 107 may detect an action or a series of actions performed by a vehicle operator with respect to vehicle controls, interfacing devices within the vehicle 105, or other devices for actuating one or more vehicle functions. In one embodiment, driver behavior data may indicate driver behaviors that do not directly affect vehicle controls. Such behavior data may be captured via image sensors within the vehicle 105. By way of example, such driver behavior data may be defined by a location of the vehicle operator's head, a trajectory or a movement of the vehicle operator's head, an orientation of the vehicle operator's head, a plurality of orientations of the vehicle operator's head for a predetermined amount of time, the vehicle operator's facial expression, the vehicle operator's facial expressions for a predetermined amount of time, the vehicle operator's eye direction, the vehicle operator's eye directions for a predetermined amount of time, one or more words spoken by the vehicle operator, or a combination thereof. In one embodiment, the detection module 201 may acquire the driver behavior data via the UE 101. By way of example, the UE 101 may be a wearable device equipped with sensor (e.g., gyro sensors) for detecting movement of a vehicle operator's hands. Once a vehicle operator enters the vehicle 105, the UE 101 and the vehicle 105 may establish communication to enable the vehicle 105 to track movements of the vehicle operator's hands via the UE 101. Based on the movements of the vehicle operator's hands, the detection module 201 may determine how the vehicle 105 is being maneuvered by the vehicle operator.

In one embodiment, the detection module 201 may acquire vehicle behavior data from the vehicle 105. The vehicle behavior data may indicate a way of which the vehicle 105 moves. The vehicle behavior data may indicate a way of which the vehicle 105 moves within a predetermined period or a way of which the vehicle 105 moves while being within a predetermined distance with respect to a portion of a road. By way of example, the vehicle behavior data may indicate that the vehicle 105 slowly moves forward when the vehicle 105 is within a predetermined distance from an intersection. In one embodiment, the vehicle behavior data may be defined by GPS data associated with the vehicle 105. In one embodiment, the vehicle behavior data may correspond to driver behavior data in that the driver behavior data can be defined by one or more actions performed by a vehicle operator that directly affect the movement of the vehicle 105.

In one embodiment, the detection module 201 may continuously receive driver/vehicle behavior data from the vehicle 105 as the vehicle 105 traverses a route. In one embodiment, the detection module 201 may receive driver/vehicle behavior data from the vehicle 105 only when the vehicle 105 is traversing or will be traversing one or more portions of the route that: (1) is known to include or is proximate to one or more temporary dynamic obstructions; or (2) has previously included or was proximate to one or more temporary dynamic obstructions.

In one embodiment, the detection module 201 determines whether there is at least one image sensor available within the vicinity of a location in which the vehicle 105 has acquired driver/vehicle behavior data indicating existence of a temporary dynamic obstruction. By way of example, such image sensor may be equipped by the vehicle 105 or one or more detection entities 113 within the vicinity of the location. If such image sensor is available, the detection module 201 acquires one or more images from said sensor. Said images may be captured at a time point in which the driver/vehicle behavior data indicate existence of a temporary dynamic obstruction or over a predetermined amount period including the time point. In one embodiment, if no image sensor is available within a vicinity of the location at a time point in which the driver/vehicle behavior data indicate existence of a temporary dynamic obstruction, the detection module 201 may rely on images captured at time points preceding the time point or images captured at time points following the time point. Such images may be processed by the calculation module 203 for validating the existence of the temporary dynamic obstruction. In one embodiment, the detection module 201 may acquire a route of the vehicle 105 and/or one or more routes of one or more detection entities 113 that is non-stationary (e.g., other vehicles) and attribute data of one or more images sensors equipped by the vehicle 105 and/or the one or more detection entities 113. Such information may be used by the calculation module 203 to estimate one or more detection areas and determine whether an estimated location of a temporary dynamic obstruction is within the detection areas.

In one embodiment, the detection module 201 acquires weather data associated with a location in which the vehicle 105 has acquired driver/vehicle behavior data indicating existence of a temporary dynamic obstruction. Such weather data may be acquired from the services platform 115 (e.g., weather-based service platform), the content providers 119, or a combination thereof. In one embodiment, the detection module 201 acquires winter service vehicle travel data associated with a portion of a road in which the vehicle 105 has acquired driver/vehicle behavior data indicating existence of a temporary dynamic obstruction. The winter service vehicle travel data may indicate a number of instances in which one or more winter service vehicles has traversed a given portion of a road. In one embodiment, the detection module 201 acquires attribute data associated with a portion of a road in which the vehicle 105 has acquired driver/vehicle behavior data indicating existence of a temporary dynamic obstruction. Such attributes may indicate that the portion of the road is within a zone that is assigned with a type of variance that is known to induce heavy traffic (e.g., a drive-through variance).

Figure 3A:
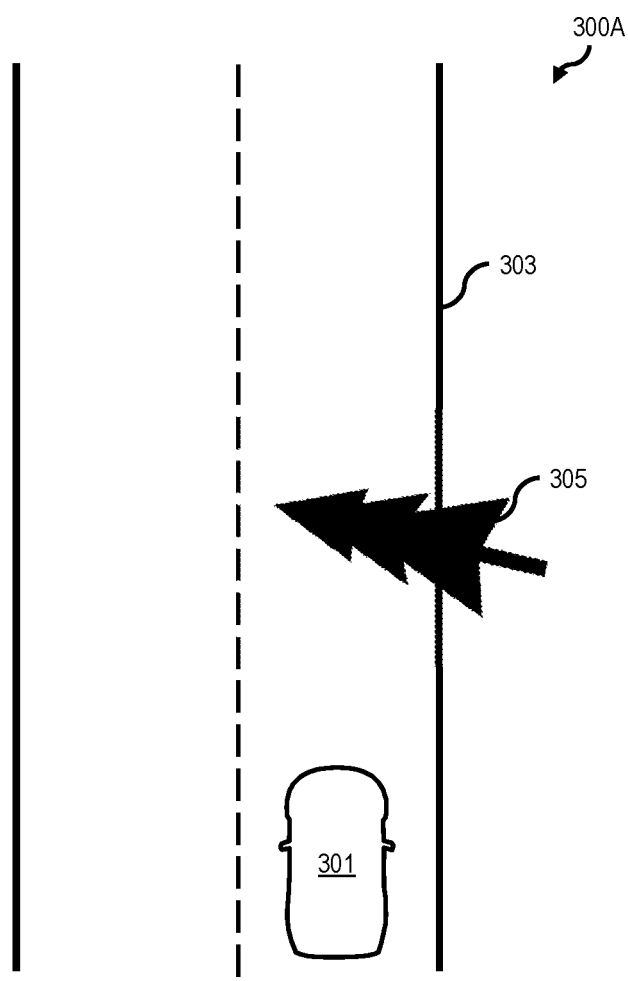
FIG. 3A illustrates an example scenario in which a vehicle encounters a temporary dynamic obstruction in a road link.
Figure 3B:
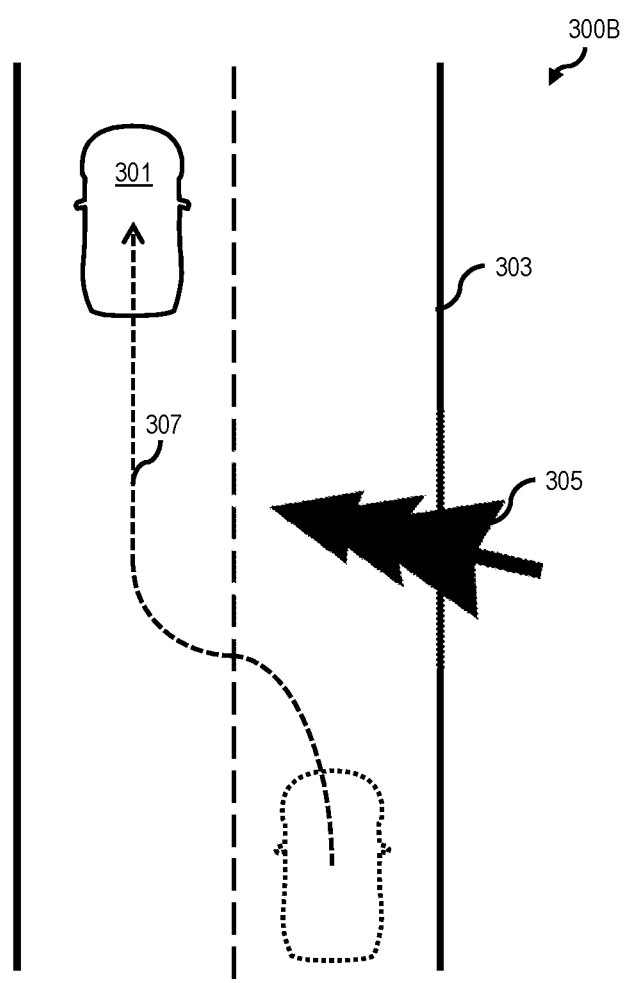
FIG. 3B illustrates a subsequent example scenario in which the vehicle avoids the temporary dynamic obstruction.
Figure 4A:
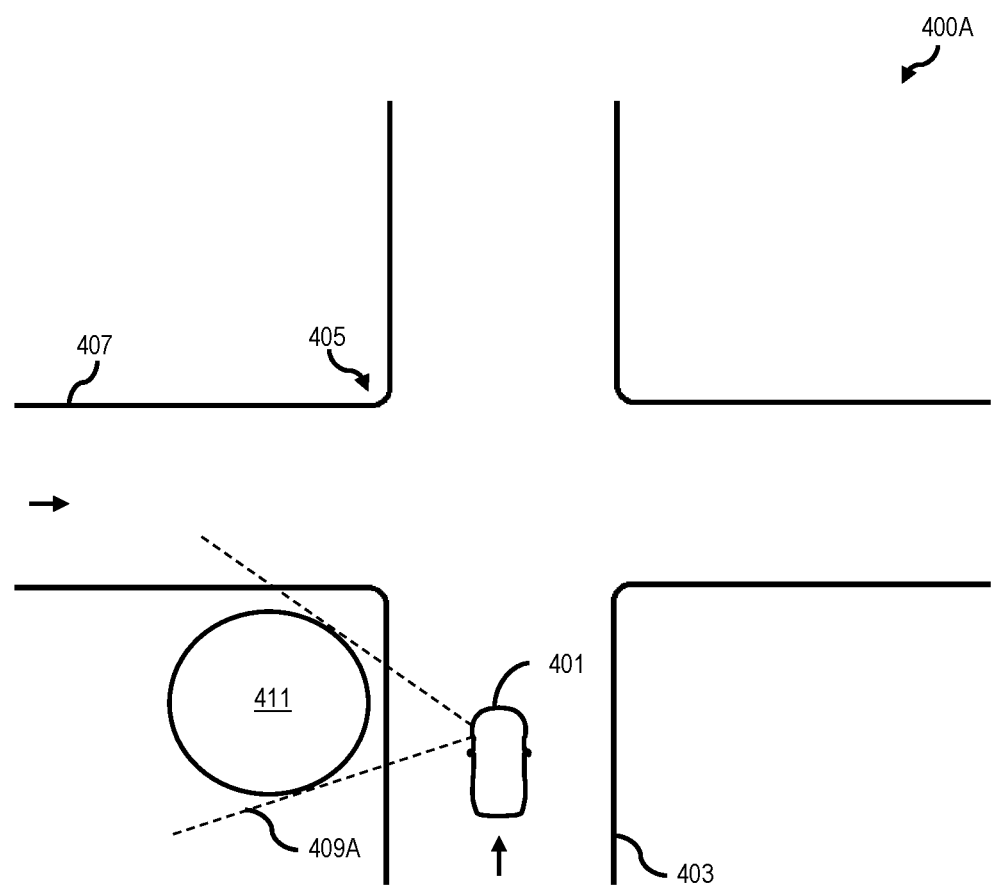
FIG. 4A illustrates another example scenario in which a vehicle encounters a temporary dynamic obstruction proximate to an intersection.
Figure 4B:
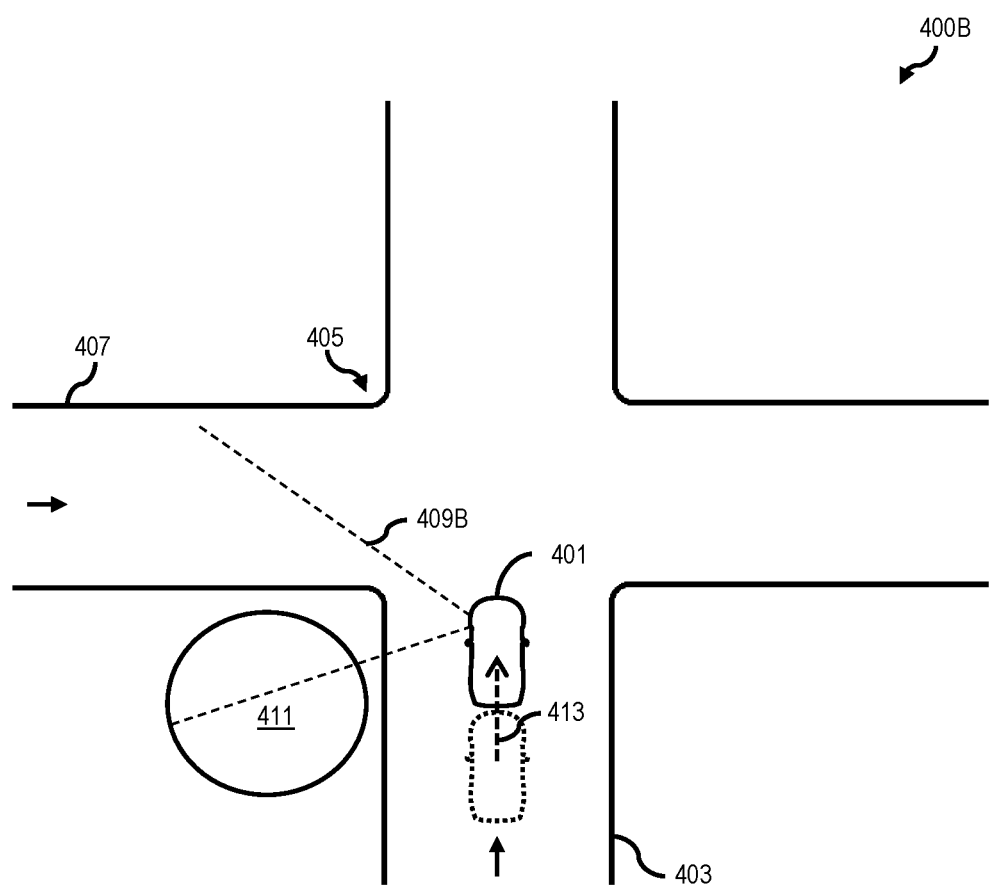
FIG. 4B illustrates a subsequent example scenario in which a vehicle operator maneuvers the vehicle to gain a better view of the intersecting road.

The calculation module 203 receives driver/vehicle behavior data and uses a machine learning model to determine whether the driver/vehicle behavior data received as input are driver/vehicle behavior data that indicate existence of a temporary dynamic obstruction. For example, FIG. 3A illustrates an example scenario 300A in which a vehicle encounters a temporary dynamic obstruction in a road link. In the illustrated example, a vehicle 301 is traversing a two-lane road link 303 and encounters a temporary dynamic obstruction 305. In such example, the temporary dynamic obstruction 305 is a fallen tree. FIG. 3B illustrates a subsequent example scenario 300B in which the vehicle avoids the temporary dynamic obstruction. In FIG. 3B, the operator of the vehicle 301 performs a maneuver 307 such that vehicle 301 resumes the route thereof and avoids the temporary dynamic obstruction 305. The maneuver 307 performed by the vehicle operator is captured by the vehicle 301 as vehicle/driver behavior data and provided to the calculation module 203 as input. The calculation module 203 compares the vehicle/drive behavior data received as input to past vehicle/driver behavior data that indicate existence of a temporary dynamic obstruction. In such example, the calculation module 203 determines that the vehicle/driver behavior data received as input correspond to one of the past vehicle/driver behavior data that indicate existence of a temporary dynamic obstruction. As such, the calculation module 203 determines that the vehicle/driver behavior data corresponding to the maneuver 307 indicates existence of a temporary dynamic obstruction. As the calculation module 203 receives similar vehicle/driver behavior data from other vehicles traversing the road link 303, the calculation module 203 identifies a location at which the vehicle 301 and the other vehicles have moved to a different lane, thereby enabling the calculation module 203 to estimate a location in which the temporary dynamic obstruction 305 is formed within the road link 303. FIG. 4A illustrates another example scenario 400A in which a vehicle encounters a temporary dynamic obstruction proximate to an intersection. In the illustrate example, a vehicle 401 is traversing a first one-way road link 403 and encounters an intersection 405 that connects a second one-way road link 407. In the illustrated example, the operator of the vehicle 401 is attempting to merge into to the second road link 407 by focusing his/her field-of-vision (FOV) 409A to the second road link 407; however, the FOV 409A of the vehicle operator is obstructed by a temporary dynamic obstruction 411, thereby hindering the vehicle operator from merging into the second road link 407. In the illustrate example, the temporary dynamic obstruction 411 is a snow mound. FIG. 4B illustrates a subsequent example scenario 400B in which the vehicle operator maneuvers the vehicle to gain a better view of the intersecting road. In the illustrated example, the vehicle operator has performed a maneuver 413 to gain an improved FOV 409B. In the illustrated example, the maneuver 413 is defined by repeated actuations of a brake pedal, thereby causing the vehicle 401 to slowly move forward. The maneuver 413 performed by the vehicle operator is captured by the vehicle 401 as vehicle/driver behavior data and provided to the calculation module 203 as input. The calculation module 203 compares the vehicle/drive behavior data received as input to past vehicle/driver behavior data that indicate existence of a temporary dynamic obstruction. In such example, the calculation module 203 determines that the vehicle/driver behavior data received as input correspond to one of the past vehicle/driver behavior data that indicate existence of a temporary dynamic obstruction. As such, the calculation module 203 determines that the vehicle/driver behavior data corresponding to the maneuver 413 indicates existence of a temporary dynamic obstruction. As the calculation module 203 receives similar vehicle/driver behavior data from other vehicles encountering the intersection 405, the calculation module 203 observes the road links used by the vehicle 401 and the other vehicles traverse the intersection 405, thereby enabling the calculation module 203 to estimate a location in which the temporary dynamic obstruction 411 is formed with respect to the intersection 405. It should be appreciated that factors for identifying driver behavior data that indicate existence of a temporary dynamic obstruction is not limited to driver's interactions with respect to vehicle controls. By way of example, in lieu of using driver behavior data derived from the maneuver 413 as shown in FIG. 4B, the calculation module 203 may use driver behavior data defined by movements of the driver's head. In such example, if the driver behavior data indicates that the driver moves his/her head forward to gain an improved FOV, such driver behavior data may also indicate that a temporary dynamic obstruction exists proximate to the intersection 405.

Returning to FIG. 2, to determine whether driver/vehicle behavior data received as input correspond to one or more past driver/vehicle behavior data indicating existence of a temporary dynamic obstruction, the calculation module 203 may select a subset among a plurality of past driver/vehicle behavior data. For example, calculation module 203 may: (1) select a subset from a plurality of past driver/vehicle behavior data indicating existence of a temporary dynamic obstruction based on a location of the vehicle 105 with respect to a specific portion of a road; and (2) compare driver/vehicle behavior data received as input with the subset. For example, if the calculation module 203 determines that the vehicle 105 is at or will be encountering an intersection, the calculation module 203 selects a subset of past driver/vehicle behavior data indicating existence of a temporary dynamic obstruction at the intersection and compares driver/vehicle behavior data received as input with the subset. In one embodiment, the calculation module 203 identifies an attribute associated with a specific portion of a road and uses the attribute to select a subset for comparison. For example, continuing from the previous example, if the calculation module 203 determines that a subset of past driver/vehicle behavior data indicating existence of a temporary dynamic obstruction at the intersection does not exist, the calculation module 203: (1) identifies attributes of the intersection (e.g., type of intersection, width, number intersections, number of lanes of each intersecting road, etc.); (2) identifies another intersection having similar attributes as the intersection; (3) selects a subset of past driver/vehicle behavior data indicating existence of a temporary dynamic obstruction at the other intersection; and (4) compares driver/vehicle behavior data received as input with the subset of the other intersection.

Figure 5A:
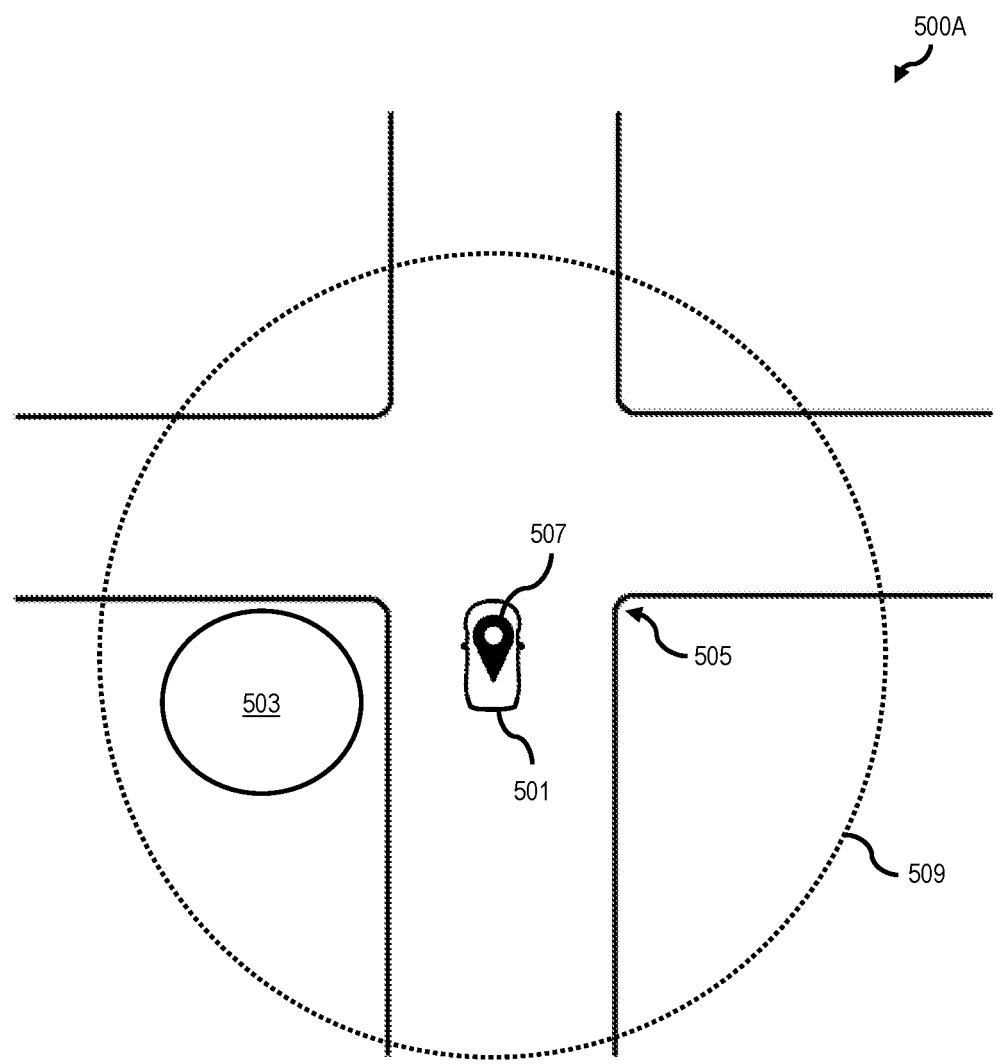
FIG. 5A illustrates an example scenario in which no image sensor is available within a vicinity of a location in which driver/vehicle behavior data are acquired by a vehicle.
Figure 5B:
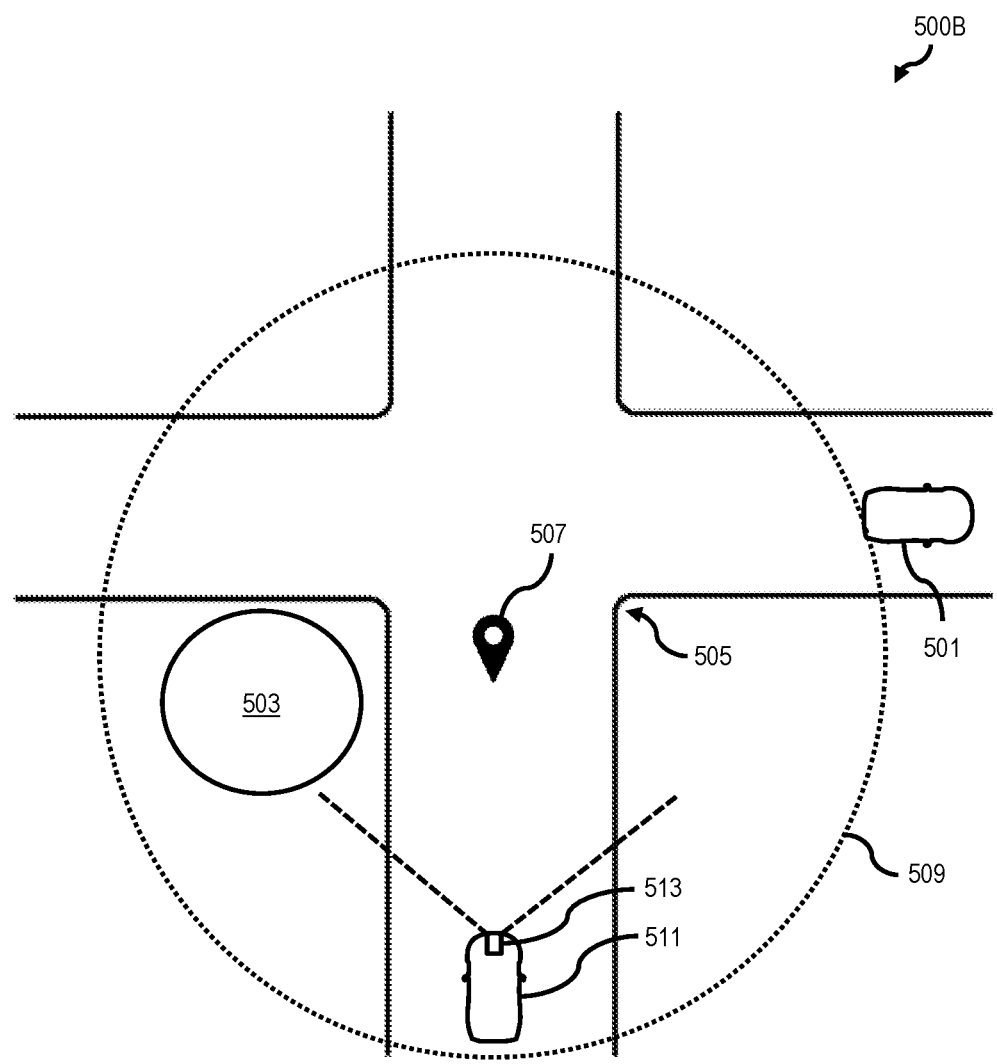
FIG. 5B illustrates a subsequent example scenario in which another vehicle validates existence of a temporary dynamic obstruction using an image sensor.

Once drive/vehicle behavior data received as input indicate existence of a temporary dynamic obstruction, the calculation module 203 may rely on at least one image captured by an image sensor within a vicinity of a location in which the drive/vehicle behavior data are acquired by the vehicle 105 to validate the existence of the temporary dynamic obstruction. Generally, the calculation module 203 may receive such image shortly after a time point at which the drive/vehicle behavior data are acquired by the vehicle 105. However, it is contemplated that such image sensor may not be immediately available subsequent to the time point. For example, FIG. 5A illustrates an example scenario 500A in which no image sensor is available within a vicinity of a location in which drive/vehicle behavior data are acquired by a vehicle. In the illustrated example, a first vehicle 501 has encountered a temporary dynamic obstruction 503 and an intersection 505, and the calculation module 203 has determined that the driver/vehicle behavior data acquired from the first vehicle 501 indicate existence of the temporary dynamic obstruction 503. The detection module 201 determines whether an image sensor is available within a vicinity 509 of a location 507 in which the driver/vehicle behavior data are acquired from the first vehicle 501. However, since there is no image sensor available within the vicinity 509, the calculation module 203 cannot immediately validate the existence. FIG. 5B illustrates a subsequent example scenario 500B in which another vehicle validates existence of a temporary dynamic obstruction using an image sensor. In the illustrated example, after the first vehicle 501 traverses the intersection 505, a second vehicle 511 equipped with an image sensor 513 encounters the temporary dynamic obstruction 503 and captures an image including the temporary dynamic obstruction 503. The detection module 201 determines that the second vehicle 511 enters the vicinity 509 and acquires the image from the second vehicle 511. As such, the calculation module 203 validates the driver/vehicle behavior data acquired from the first vehicle 501 by using the image captured by the second vehicle 511.

The calculation module 203 may use a machine learning model for identifying a temporary dynamic obstruction from an image. By way of example, the machine learning model may be defined, at least in part by, computer-vision algorithms, such as CNN. The calculation module 203 may identify one or more attributes of the temporary dynamic obstruction such as a type of temporary dynamic obstruction, a shape/size of the temporary dynamic obstruction, an estimated amount of time that the temporary dynamic obstruction is predicted to exist, or a combination thereof.

In one embodiment, if driver/vehicle behavior data acquired from the vehicle 105 indicate existence of a temporary dynamic obstruction, the calculation module 203 may validate the existence of the temporary dynamic obstruction by acquiring weather data associated with a location in which the vehicle 105 acquired the driver/vehicle behavior data. For example, if the weather data indicate that a storm, a snowstorm, or a snowfall has recently affected the location, the calculation module 203 may indicate that the temporary dynamic obstruction is likely to exist at the location.

In one embodiment, the calculation module 203 may use a machine learning model to estimate a duration of which a temporary dynamic obstruction is predicted to exist. In such embodiment, the machine learning model may estimate the duration based on data indicating: (1) a location of the temporary dynamic obstruction; (2) attribute associated with the temporary dynamic obstruction (e.g., type of temporary dynamic obstruction, a shape/size of temporary dynamic obstruction, etc.); (3) a current weather condition and/or one or more future weather conditions for the location of the temporary dynamic obstruction; or (4) a combination thereof. The machine learning model may be trained by using historical data indicating: (1) locations of past temporary dynamic obstructions; (2) attributes of past temporary dynamic obstructions; (3) past weather conditions that affected the locations; (4) past events that occurred proximate to the locations; or (5) a combination thereof. In one embodiment, the machine learning model may receive a starting time/day of the duration and calculate the duration by selecting one or more of the historical data that are associated with similar time/day as the starting time/day.

In one embodiment, the calculation module 203 may assign a confidence value indicating a confidence of a temporary dynamic obstruction existing at a given location. The confidence value may be a sum of subsidiary confidence values. The subsidiary confidence values include: (1) a first subsidiary confidence value defined by one or more instances in which the existence of the temporary dynamic obstruction is validated through vehicle/driver behavior data; (2) a second subsidiary confidence value defined by one or more instances of which the existence of the temporary dynamic obstruction is validated through image data; and (3) a third subsidiary confidence value defined by one or more instances of which the existence of the temporary dynamic obstruction is validated through weather data. In one embodiment, each of the plurality of subsidiary confidence values may be assigned with a weight. In one embodiment, each of the first and the second subsidiary confidence values may be assigned with a greater weight than the third subsidiary confidence value. In one embodiment, the weight of the second subsidiary confidence value may be the greatest. Each of the subsidiary confidence values may decay over time. Specifically, if the process of validating the existence of a temporary dynamic obstruction does not occur for a predetermined duration, a subsidiary confidence value decreases a predetermined amount. As such, if the process of validating the existence of the temporary dynamic obstruction does not occur for a duration greater than the predetermined duration (e.g., multitudes of the predetermined duration), the calculation module 203 eventually removes a data point indicating the existence of the temporary dynamic obstruction from a map layer.

One or more additional subsidiary confidence values is contemplated. For example, the calculation module 203 may receive from the detection module 201 data indicating that a number of winter service vehicles have traversed an intersection, thereby indicating likelihood of a temporary dynamic obstruction, such as a snow mound, forming at one or more corners of the intersection. Such data may be used to establish an additional subsidiary confidence value. By way of another example, the calculation module 203 may receive data from the detection module 201 indicating attributes associated with one or more portions of a road. Such attributes may indicate that the one or more road segments and/or intersections is within a zone that is assigned with a specific type of variance, such as a drive-through variance. If so, the calculation module 203 may increase a subsidiary confidence value.

The calculation module 203 updates a map layer based on a confidence value of a temporary dynamic obstruction. Specifically, if a confidence value exceeds a threshold value, the calculation module 203 may update a map layer to indicate that a temporary dynamic obstruction exists at a given location, and conversely, if the confidence value is at or below the threshold value, the calculation module 203 may update the map layer to remove the temporary dynamic obstruction.

The notification module 205 may cause a notification to the UE 101, other notification devices within the vehicle 105, local municipalities, or other establishments. In one embodiment, the notification may indicate: (1) existence of a temporary dynamic obstruction; (2) location of the temporary dynamic obstruction; (3) a type of temporary dynamic obstruction; (4) a shape/size of the temporary dynamic obstruction; (5) an estimated amount of time that the temporary dynamic obstruction is predicted to exist; (6) a confidence value associated with the temporary dynamic obstruction; or (7) a combination thereof. The notification may be generated as a sound notification, display notification, vibration, or a combination thereof.

The presentation module 207 obtains a set of information, data, and/or calculated results from other modules, and continues with providing a presentation of a visual representation to the UE 101. The visual representation may indicate any of the information presented by the notification module 205. In one embodiment, the visual representation may be presented as a combination of map layers including a map layer of one or more temporary dynamic obstructions and other map layers indicating other information such as a degree of traffic, a type of weather affecting one or more road segments, etc.

The machine learning module 209 embodies various machine learning models for providing a map layer of one or more temporary dynamic obstructions. Specifically, the machine learning module 209 includes models for: (1) determining whether driver/vehicle behavior data received as input are driver/vehicle behavior data indicating existence of a temporary dynamic obstruction; (2) determining a location of a temporary dynamic obstruction using driver/vehicle behavior data; (3) determining existence of a temporary dynamic obstruction by analyzing one or more images; (4) determining a type of temporary dynamic obstruction, a shape/size of temporary dynamic obstruction, an estimated amount of time that the temporary dynamic obstruction is predicted to exist, or a combination thereof by analyzing one or more images; and (5) determining a duration of which a temporary dynamic obstruction is predicted to exist. The machine learning models may be trained by using historical data stored in the database 125. In one embodiment, the machine learning models may be continuously trained as the detection module 201 and the calculation module 203.

The above presented modules and components of the obstruction mapping platform 123 can be implemented in hardware, firmware, software, or a combination thereof. Though depicted as a separate entity in FIG. 2, it is contemplated that the obstruction mapping platform 123 may be implemented for direct operation by the UE 101, the vehicle 105, the services platform 115, one or more of the content providers 119, or a combination thereof. As such, the obstruction mapping platform 123 may generate direct signal inputs by way of the operating system of the UE 101, the vehicle 105, the services platform 115, the one or more of the content providers 119, or the combination thereof for interacting with the applications 103. The various executions presented herein contemplate any and all arrangements and models.

Figure 6:
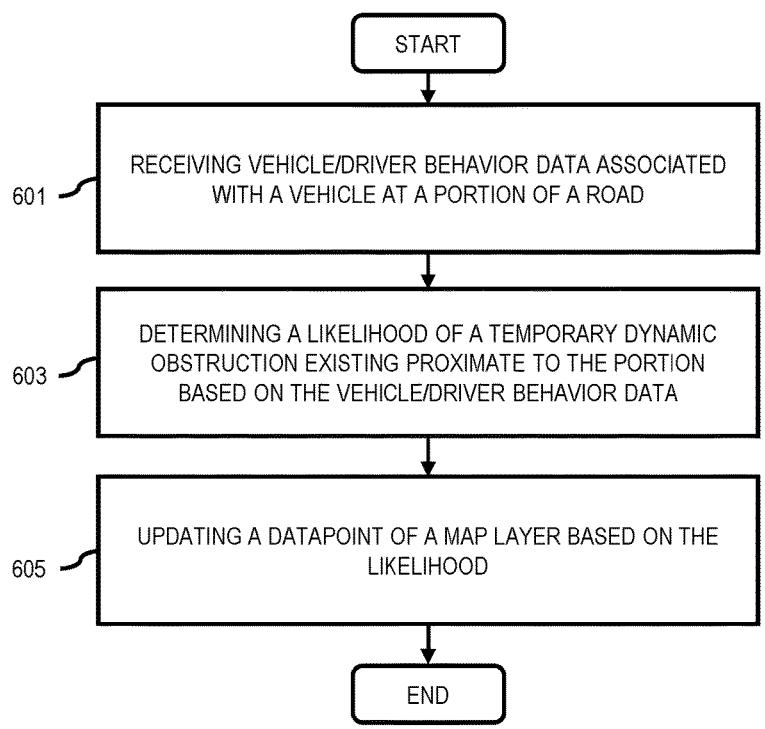
FIG. 6 illustrates a flowchart of a process for updating a map layer of one or more temporary dynamic obstructions using vehicle/driver behavior data.
Figure 9:
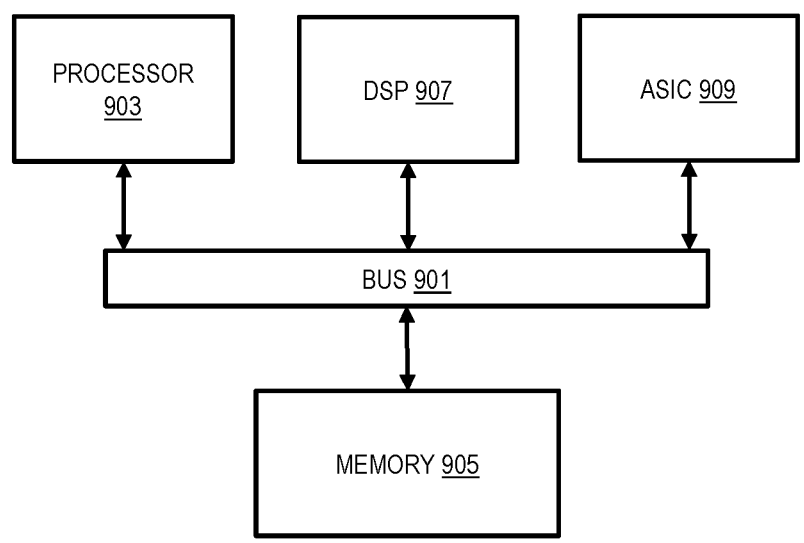
FIG. 9 illustrates a chip set or chip upon which an embodiment may be implemented.

FIG. 6 is a flowchart of a process 600 for updating a map layer of one or more temporary dynamic obstructions using vehicle/driver behavior data, according to one embodiment. In one embodiment, the obstruction mapping platform 123 performs the process 600 and is implemented in, for instance, a chip set including a processor and a memory as shown in FIG. 9.

In step 601, the obstruction mapping platform 123 receives vehicle/driver behavior data associated with the vehicle 105 at a portion of a road. The driver behavior data may indicate an action or a series of actions performed by a vehicle operator with respect to vehicle controls, interfacing devices within the vehicle 105, or other devices for actuating one or more vehicle functions. In one embodiment, the driver behavior data may indicate driver behaviors that do not directly affect vehicle controls. The vehicle behavior data may indicate a way of which the vehicle 105 moves. In one embodiment, the vehicle behavior data may be defined by GPS data associated with the vehicle 105. In one embodiment, the vehicle behavior data may correspond to driver behavior data in that the driver behavior data can be defined by one or more actions performed by a vehicle operator that directly affect the movement of the vehicle 105.

In step 603, the obstruction mapping platform 123 determines a likelihood of a temporary dynamic obstruction existing proximate to the portion based on the vehicle/driver behavior data. The obstruction mapping platform 123 may embody a machine learning model that receives the driver/vehicle behavior data as input and outputs an indication of whether a temporary dynamic obstruction exists proximate to the vehicle 105. The machine learning model may compare the inputted driver/vehicle behavior data to one or more past driver/vehicle behavior data indicating existence of a temporary dynamic obstruction. If the inputted driver/vehicle behavior data correspond to one of such past driver/vehicle behavior data, the obstruction mapping platform 123 may increase the likelihood of the temporary dynamic obstruction existing proximate to the vehicle 105. However, if the inputted driver/vehicle behavior data do not correspond to one of such past driver/vehicle behavior data, the obstruction mapping platform 123 may decrease the likelihood of the temporary dynamic obstruction existing proximate to the vehicle 105.

In step 605, the obstruction mapping platform 123 updates a datapoint of a map layer based on the likelihood. The datapoint indicates a state of existence of the temporary dynamic obstruction at the portion. If the likelihood is greater than a threshold, the obstruction mapping platform 123 updates the datapoint to indicate that the temporary dynamic obstruction exists at the portion. However, if the likelihood is less than or equal to a threshold, the obstruction mapping platform 123 updates the datapoint to indicate that the temporary dynamic obstruction does not exist at the portion.

Figure 7:
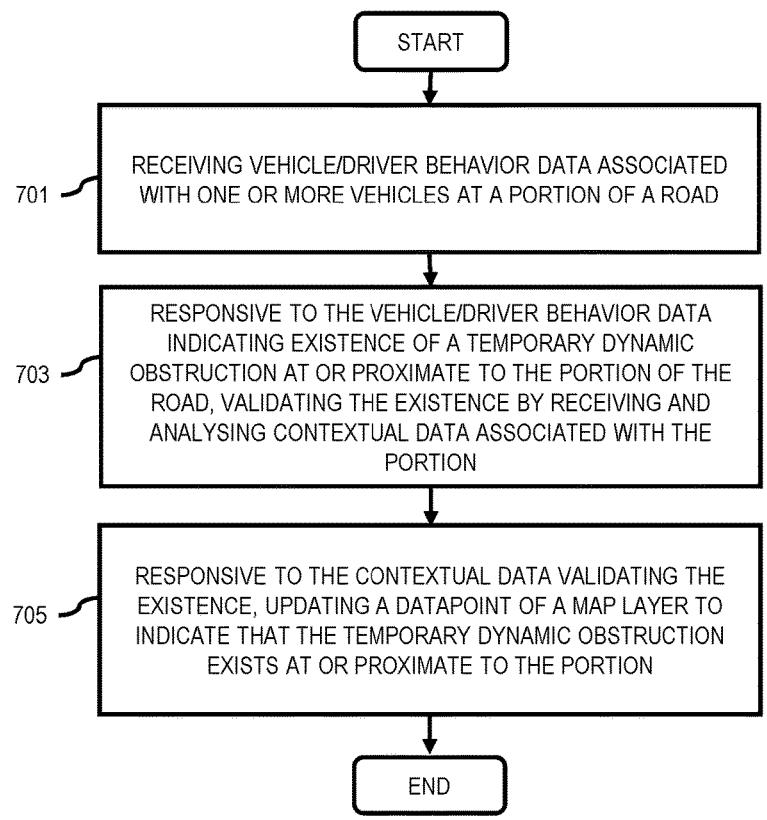
FIG. 7 illustrates a flowchart of a process for updating a map layer of one or more temporary dynamic obstructions using vehicle/driver behavior data and contextual data.

FIG. 7 is a flowchart of a process 700 for updating a map layer of one or more temporary dynamic obstructions using vehicle/driver behavior data and contextual data, according to one embodiment. In one embodiment, the obstruction mapping platform 123 performs the process 600 and is implemented in, for instance, a chip set including a processor and a memory as shown in FIG. 9.

In step 701, the obstruction mapping platform 123 receives vehicle/driver behavior data associated with the vehicle 105 at a portion of a road. The driver behavior data may indicate an action or a series of actions performed by a vehicle operator with respect to vehicle controls, interfacing devices within the vehicle 105, or other devices for actuating one or more vehicle functions. In one embodiment, the driver behavior data may indicate driver behaviors that do not directly affect vehicle controls. The vehicle behavior data may indicate a way of which the vehicle 105 moves. In one embodiment, the vehicle behavior data may be defined by GPS data associated with the vehicle 105. In one embodiment, the vehicle behavior data may correspond to driver behavior data in that the driver behavior data can be defined by one or more actions performed by a vehicle operator that directly affect the movement of the vehicle 105.

In step 703, if the vehicle/driver behavior data indicate existence of a temporary dynamic obstruction at or proximate to the portion of the road, the obstruction mapping platform 123 validates the existence by receiving and analyzing contextual data associated with the portion. The contextual data may be image data associated with the portion, weather data associated with the portion, or a combination thereof. The image data may include a plurality of images captured by the vehicle 105 for a predetermined period, where the predetermined period includes a time point or a period in which the obstruction mapping platform 123 has acquired the driver/vehicle behavior data. In one embodiment, the image data may be a plurality of images captured by at least one detection entity 113 that is within or proximate to a location in which the vehicle 105 has acquired the driver/vehicle behavior data. The obstruction mapping platform 123 may embody a machine learning model for identifying a temporary dynamic obstruction from the plurality of images. By way of example, the machine learning model may be defined, at least in part by, computer-vision algorithms, such as convolutional neural networks (CNN). The weather data may indicate a current weather condition and/or one or more past weather conditions that have affected a location in which the vehicle 105 has acquired the driver/vehicle behavior data. If the current weather condition and/or the one or more past weather conditions are types of weather conditions are known to render temporary dynamic obstructions, the obstruction mapping platform 123 determines that the temporary dynamic obstruction exists based on the weather data. The weather data may indicate precipitation type, precipitation intensity, air temperature, precipitation rate, wind direction, or a combination thereof. The weather data may indicate that a storm, a snowstorm, or a snowfall has recently affected a given area.

In step 705, if the contextual data validates the existence, update a datapoint of a map layer to indicate that the temporary dynamic obstruction exists at or proximate to the portion. The temporary dynamic obstruction 123 updates a datapoint of a map layer to indicate that the temporary dynamic obstruction exists at or proximate to the intersection. In one embodiment, the datapoint may be associated with a confidence value, and the temporary dynamic obstruction 123 may increase the confidence value if the contextual data validates the existence. If additional vehicle/driver behavior data and contextual data are received and validate the existence, the temporary dynamic obstruction 123 may continue to increase the confidence value. In such embodiment, if the confidence value exceeds a threshold value, the temporary dynamic obstruction 123 may update the datapoint of the map layer to indicate that the temporary dynamic obstruction exists at or proximate to the intersection.

The system, apparatus, and methods described herein enable a map-based server/platform to identify existence of temporary dynamic obstructions within a road network by using vehicle/driver behavior data associated with vehicles and validating the existence using other data such as image data and weather data that are localized to locations in which the vehicles acquired the vehicle/driver behavior data. It is contemplated that such system consumes lesser computing resources than a system that continuously acquires and analyzes image data to detect temporary dynamic obstructions in that the data size of vehicle/driver behavior data is generally less than the data size of image data (e.g., several bytes may represent vehicle/driver behavior data as flags, whereas a single image can be multiple kilobytes). Further, since the system, apparatus, and methods described herein enable the map-based server/platform to maintain a map layer of temporary dynamic obstructions if the existence of each of the temporary dynamic obstructions is continuously validated, the map layer may be used to convey accurate information at real-time or near real-time.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
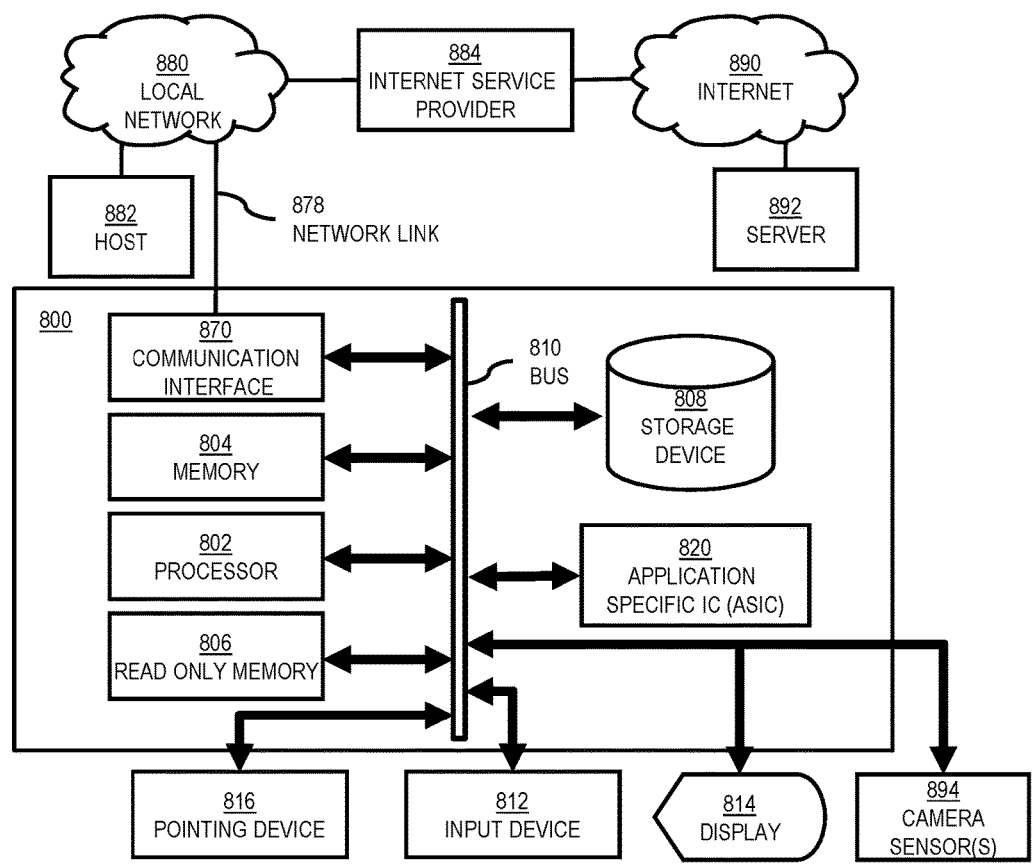
FIG. 8 illustrates a computer system upon which an embodiment may be implemented.

FIG. 8 illustrates a computer system 800 upon which an embodiment may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to providing a map layer of one or more temporary dynamic obstructions as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for providing a map layer of one or more temporary dynamic obstructions.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a map layer of one or more temporary dynamic obstructions. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing a map layer of one or more temporary dynamic obstructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a map layer of one or more temporary dynamic obstructions, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 121 for providing a map layer of one or more temporary dynamic obstructions to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 882 connected to the Internet hosts a process that provides a service in response to information received over the Internet. For example, server host 882 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 882 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment may be implemented. Chip set 900 is programmed to provide a map layer of one or more temporary dynamic obstructions, as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for providing a map layer of one or more temporary dynamic obstructions.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors. The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a map layer of one or more temporary dynamic obstructions. The memory 905 also stores the data associated with or generated by the execution of the inventive steps.

Figure 10:
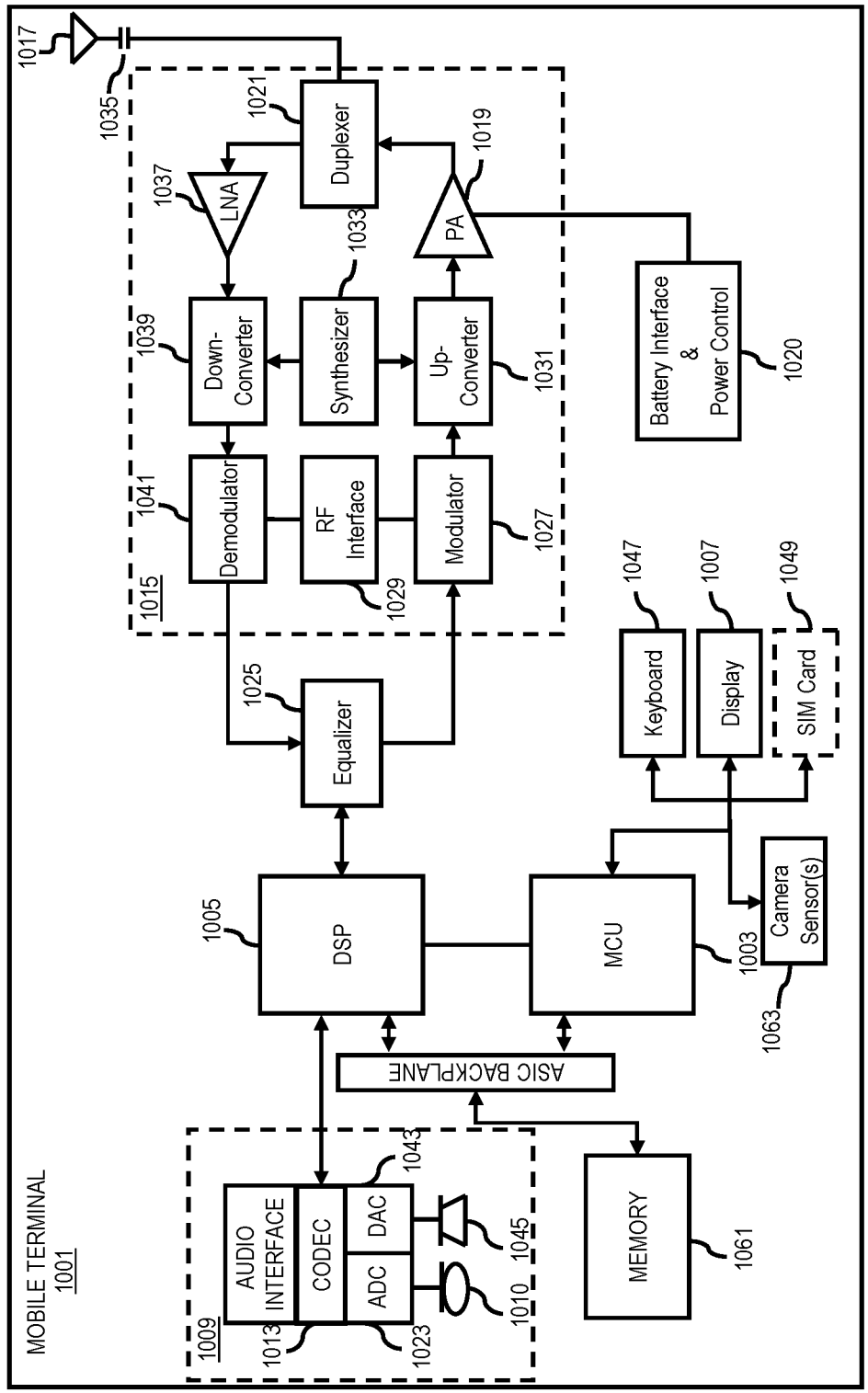
FIG. 10 illustrates a diagram of exemplary components of a mobile terminal for communications, which is capable of operating in the system of FIG. 1A.

FIG. 10 is a diagram of exemplary components of a mobile terminal 1001 (e.g., a mobile device or vehicle or part thereof) for communications, which is capable of operating in the system of FIG. 1A, according to one embodiment. In some embodiments, mobile terminal 1001, or a portion thereof, constitutes a means for providing a map layer of one or more temporary dynamic obstructions. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a map layer of one or more temporary dynamic obstructions. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 1021 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1021 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a map layer of one or more temporary dynamic obstructions. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1061. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1061 stores various data including call incoming tone data and is capable of storing other data including music data received via, e.g., the global Internet. The software module could reside in RAM memory, flash memory, registers, or any other form of writable storage medium known in the art. The memory device 1061 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1063 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   receive vehicle behavior data associated with a vehicle at a portion of a road;
   receive driver behavior data associated with the vehicle at or proximate to the portion, wherein the driver behavior data include sensor data indicating driver behaviors that do not directly affect control of the vehicle;
   determine a likelihood of a temporary dynamic obstruction existing at or proximate to the portion based on the vehicle behavior data and the driver behavior data;
   responsive to the likelihood indicating existence of the temporary dynamic obstruction at or proximate to the portion, validate the existence by:
      receiving contextual data associated with the portion, wherein the contextual data are image data including one or more images captured at the portion; and
      analysing the image data to identify the temporary dynamic obstruction within the one or more images; and
   responsive to the contextual data validating the existence, update a datapoint of a map layer to indicate that the temporary dynamic obstruction exists at or proximate to the portion.

2. The apparatus of claim 1, wherein the driver behavior data are defined, at least in part by: (i) one or more series of head movements; (ii) one or more facial gestures; (iii) one or more series of eye movements or (iv) a combination thereof.

3. The apparatus of claim 1, wherein the computer program code instructions are further configured to, when executed, cause the apparatus to:
   receive weather data indicating a weather condition affecting the portion; and
   validate the existence based on the weather data.

4. The apparatus of claim 3, wherein each of the vehicle behavior data, the image data, and the weather data are assigned with a weight that defines, at least in part, the existence.

5. The apparatus of claim 4, wherein each of the weight of the vehicle behavior data and the weight of the image data is greater than the weight of the weather data.

6. The apparatus of claim 3, wherein the computer program code instructions are further configured to, when executed, cause the apparatus to use the vehicle behavior data, the image data, the weather data, or a combination thereof to identify: (i) a location of the temporary dynamic obstruction with respect to the portion; (ii) a type of temporary dynamic obstruction corresponding to the temporary dynamic obstruction; (iii) a size of the temporary dynamic obstruction; or (iv) a combination thereof.

7. A non-transitory computer-readable storage medium having computer program code instructions stored therein, the computer program code instructions, when executed by at least one processor, cause the at least one processor to:
   receive vehicle behavior data associated with one or more vehicles at or proximate to an intersection;
   receive driver behavior data associated with the one or more vehicles at or proximate to the intersection, wherein the driver behavior data include sensor data indicating driver behaviors that do not directly affect control of the one or more vehicles;
   determine a likelihood of a temporary dynamic obstruction existing at or proximate to the intersection based on the vehicle behavior data and the driver behavior data;
   responsive to the likelihood indicating existence of the temporary dynamic obstruction at or proximate to the intersection, validate the existence by:
      receiving contextual data associated with the intersection, wherein the contextual data are image data including one or more images captured at the intersection; and
      analysing the image data to identify the temporary dynamic obstruction within the one or more images; and
   responsive to the contextual data validating the existence, update a datapoint of a map layer to indicate that the temporary dynamic obstruction exists at or proximate to the intersection.

8. The non-transitory computer-readable storage medium of claim 7, wherein the computer program code instructions, when executed by the at least one processor, further cause the at least one processor to:
   use the driver behavior data, the contextual data, or a combination thereof to determine whether the temporary dynamic obstruction corresponds to one of a plurality of types of obstruction stored in a database, wherein each of the plurality of types of obstruction is associated with obstruction attribute data; and
   responsive to the temporary dynamic obstruction corresponding to the one of the plurality of types of obstruction, update the datapoint to further indicate corresponding obstruction attribute data of the one of the plurality of types of obstruction.

9. The non-transitory computer-readable storage medium of claim 8, wherein the obstruction attribute data indicates a duration of which each of the plurality of types of obstruction is estimated to exist.

10. The non-transitory computer-readable storage medium of claim 7, wherein the driver behavior data are defined, at least in part by: (i) one or more series of head movements; (ii) one or more facial gestures; (iii) one or more series of eye movements; or (iv) a combination thereof.

11. A method of updating a map layer, the method comprising:

receiving vehicle behavior data associated with a vehicle at or proximate to an intersection;

receiving driver behavior data associated with the one or more vehicles at or proximate to the intersection, wherein the driver behavior data include sensor data indicating driver behaviors that do not directly affect control of the one or more vehicles;

determining a likelihood of a temporary dynamic obstruction existing at or proximate to the intersection based on the vehicle behavior data and the driver behavior data;

responsive to the likelihood indicating existence of the temporary dynamic obstruction at or proximate to the intersection, validating the existence by:

receiving contextual data associated with the intersection, wherein the contextual data are image data including one or more images captured at the intersection;

analysing the image data to identify the temporary dynamic obstruction within the one or more images; and responsive to the contextual data validating the existence, updating a datapoint of the map layer to indicate that the temporary dynamic obstruction exists at or proximate to the intersection.

12. The method of claim 11, the method further comprising:

using the driver behavior data, the contextual data, or a combination thereof to determine whether the temporary dynamic obstruction corresponds to one of a plurality of types of obstruction stored in a database, wherein each of the plurality of types of obstruction is associated with obstruction attribute data; and responsive to the temporary dynamic obstruction corresponding to the one of the plurality of types of obstruction, updating the datapoint to further indicate corresponding obstruction attribute data of the one of the plurality of types of obstruction.

13. The method of claim 12, wherein the obstruction attribute data indicates a duration of which each of the plurality of types of obstruction is estimated to exist.

* * * * *